US007589861B2

(12) United States Patent
Hirano

(10) Patent No.: US 7,589,861 B2
(45) Date of Patent: Sep. 15, 2009

(54) IMAGE FORMING APPARATUS AND PRINTING SYSTEM

(75) Inventor: Yuuji Hirano, Fukushima (JP)

(73) Assignee: Oki Data Corporation, Tokyo (JP)

( * ) Notice: Subject to any disclaimer, the term of this patent is extended or adjusted under 35 U.S.C. 154(b) by 710 days.

(21) Appl. No.: 11/216,237

(22) Filed: Aug. 31, 2005

(65) Prior Publication Data
US 2006/0044588 A1    Mar. 2, 2006

(30) Foreign Application Priority Data
Aug. 31, 2004    (JP) ............................. 2004-251519

(51) Int. Cl.
*G06K 15/00* (2006.01)
*H04N 1/46* (2006.01)
(52) U.S. Cl. .................... 358/1.18; 358/1.12; 358/1.16; 358/1.17; 358/538
(58) Field of Classification Search ................ 358/1.13, 358/1.16, 1.17, 1.9, 3.21, 3.24, 450, 452, 358/453, 537, 538, 539, 540
See application file for complete search history.

(56) References Cited

U.S. PATENT DOCUMENTS

| 5,493,635 | A |   | 2/1996  | Brindle et al.   |            |
|-----------|---|---|---------|------------------|------------|
| 5,555,435 | A | * | 9/1996  | Campbell et al.  | 358/1.13   |
| 5,715,379 | A | * | 2/1998  | Pavlovic et al.  | 358/1.13   |
| 6,084,688 | A | * | 7/2000  | Stumbo et al.    | 358/1.17   |
| 7,126,703 | B1 | * | 10/2006 | Gillihan et al. | 358/1.14   |
| 7,256,901 | B2 | * | 8/2007  | Ferlitsch       | 358/1.13   |
| 2004/0080768 | A1 | * | 4/2004 | Larson           | 358/1.13   |
| 2005/0117178 | A1 | * | 6/2005 | Atobe et al.    | 358/1.15   |
| 2008/0218796 | A1 | * | 9/2008 | Wanda            | 358/1.15   |

FOREIGN PATENT DOCUMENTS

JP    2000-263857 A    9/2000

* cited by examiner

*Primary Examiner*—James A Thompson
(74) *Attorney, Agent, or Firm*—Panitch Schwarze Belisario & Nadel LLP

(57) ABSTRACT

An image information processing apparatus includes a language selecting section and a print job creating section. The language selecting section selects a first page-description language and a second page-description language from among a plurality of page-description languages. The first page-description language describes a first part of an image and the second page-description language describing a second part of the image. The print job creating section creates an item of image data that contains a first item of data based on a first command system written in the first page-description language and a second item of data based on a second command system written in the second page-description language.

13 Claims, 24 Drawing Sheets

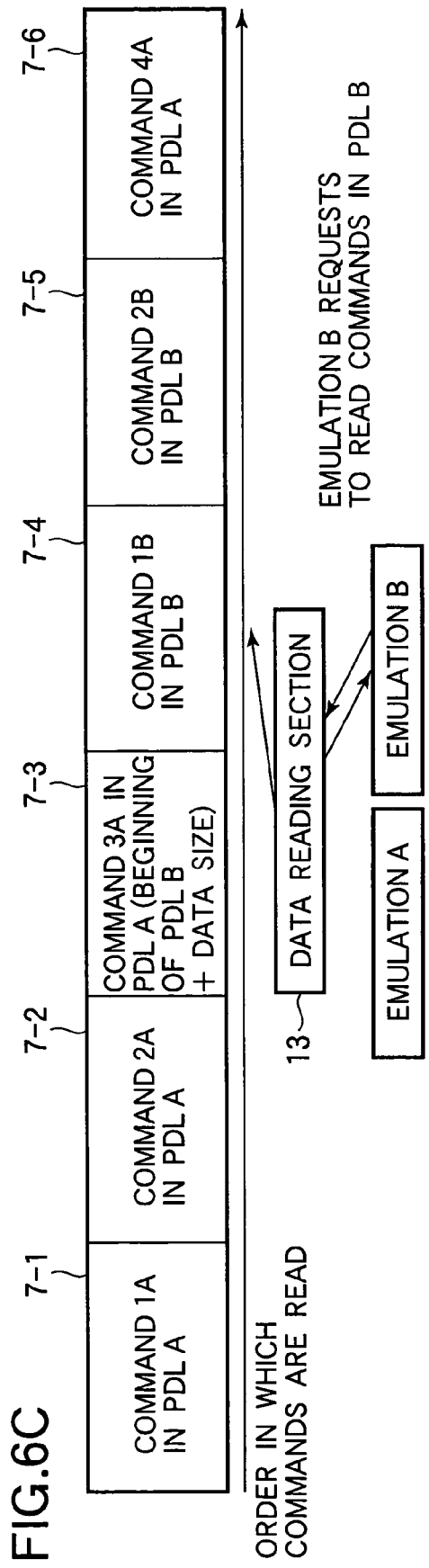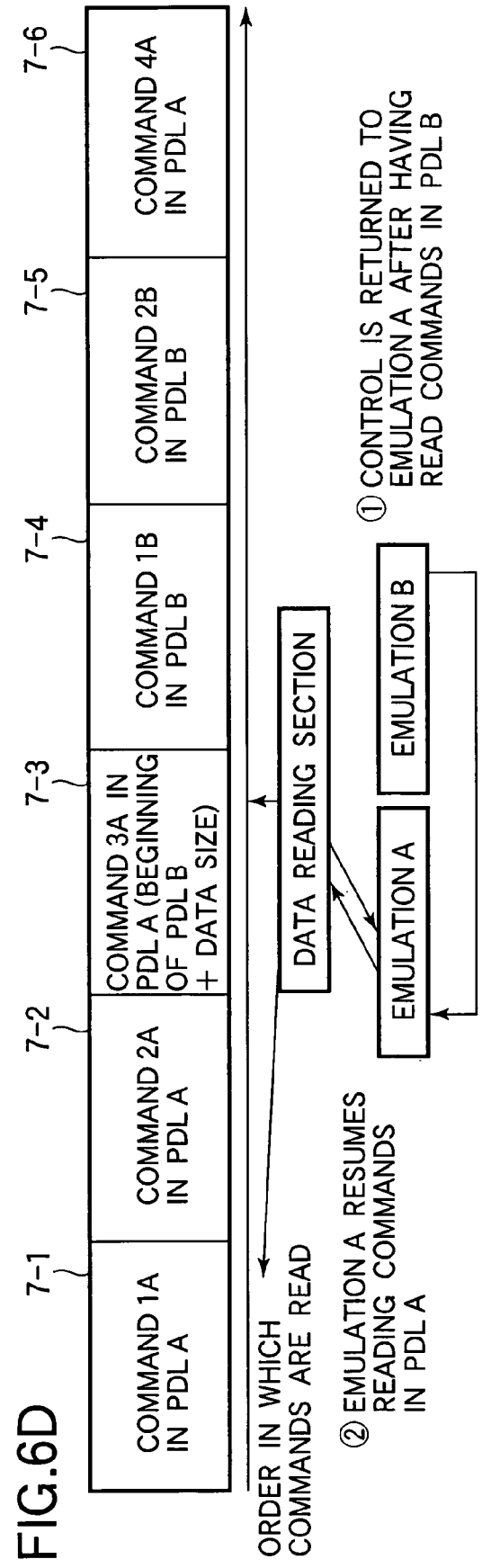

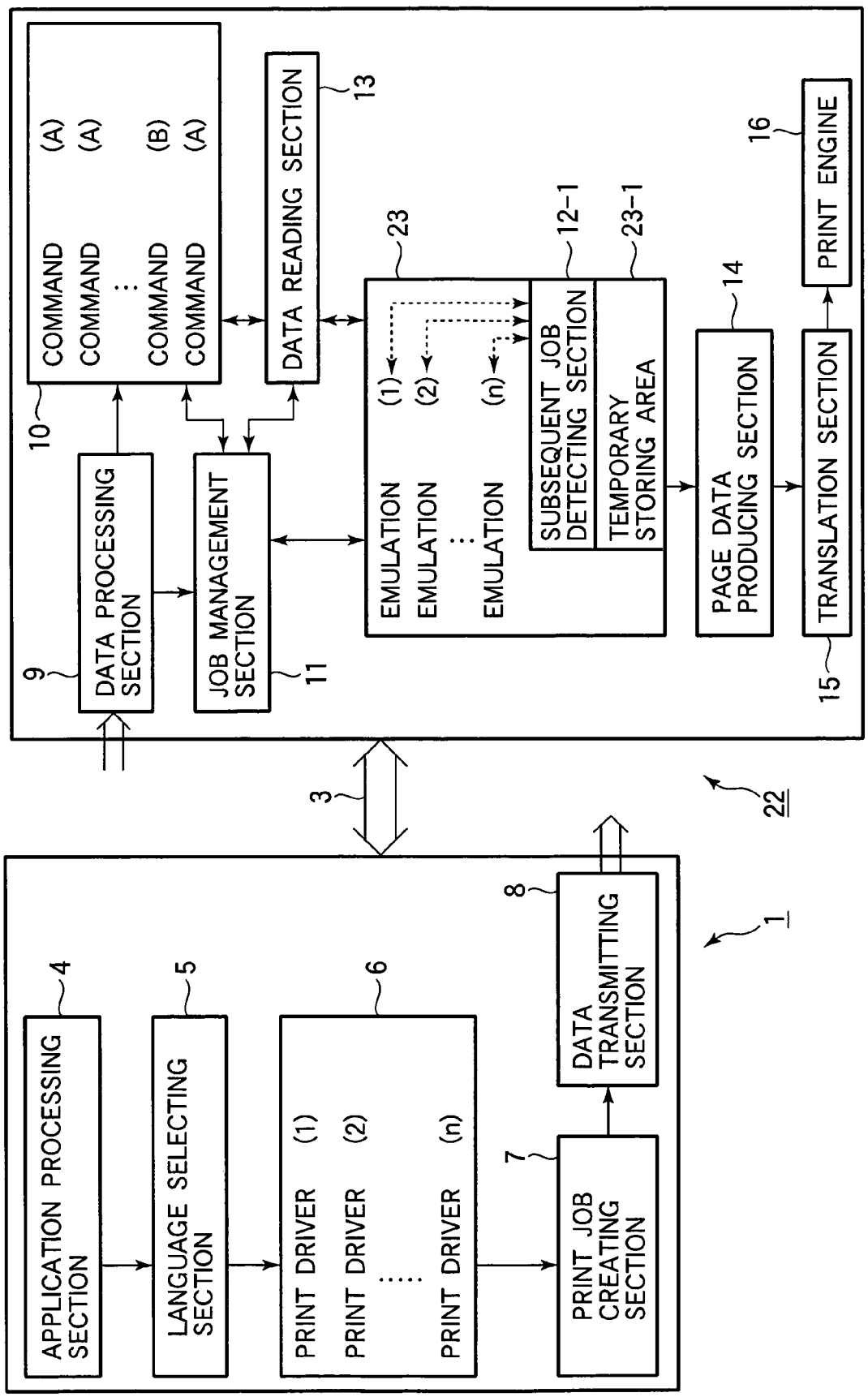

| | MODE | ANALYSIS NOT COMPLETED |
|---|---|---|
| 40-1 | MODE | ANALYSIS NOT COMPLETED |
| 40-2 | CATEGORY | 7 |
| 40-3 | INTEGER | 2 |
| 40-4 | FRACTION | 3 |
| 40-5 | SIGN | — |

FRONT PORTION (BLOCK 33-3(1) IN FIG.10)   REAR PORTION (BLOCK 33-3(2) IN FIG.10)

IMAGE FORMING APPARATUS AND PRINTING SYSTEM

BACKGROUND OF THE INVENTION

1. Field of the Invention

The present invention relates to a printing system where a plurality of page-description languages (PDL) is used to process a print job.

2. Description of the Related Art

A print job is sent from an information processing apparatus such as a personal computer to an image forming apparatus such as a printer. Conventionally, a print job is written in a single page-description language. When a print job is received in an image forming apparatus, the print job is processed in one page-description language throughout the print job. Page-description languages have their own features. Some page-description languages provide a wide variety of commands that are useful in handling graphics, and other page-description languages provide a relatively small number of commands and a high throughput, which are useful in editing a text.

Some print jobs may have graphic information inserted at several locations therein. Other print jobs may require a page-description language excellent in describing graphics as well as a page-description language suitable in describing a text portion. Conventionally, when the page-description language is switched from one to another in a print job, the image forming apparatus construes that a new job has started. Thus, the image forming apparatus outputs, in the middle of a page, a portion of the page earlier than the switching of the page description language. A complete page having graphic information cannot be printed out. A variety of techniques have been disclosed for effectively using a plurality of page-description languages.

SUMMARY OF THE INVENTION

An object of the invention is to provide an image processing apparatus in which graphic information and text information can be properly printed in a page.

Another object of the invention is to provide an image processing apparatus in which a document written in a plurality of page-description languages can be properly printed.

An image information processing apparatus includes a language selecting section and a print job creating section. The language selecting section selects a first page-description language and a second page-description language from among a plurality of page-description languages. The first page-description language describes a first part of an image and the second page-description language describing a second part of the image. The print job creating section creates an item of image data that contains a first item of data based on a first command system written in the first page-description language and a second item of data based on a second command system written in the second page-description language.

An image forming apparatus including a data receiving section, a first command analyzing section, a second command analyzing section, and a page data producing section. The data receiving section receives an image data from an image processing apparatus, the image data containing a first item of data based on a first command system and a second item of data based on a second command system. The second item of data is inserted into the first item of data. The first command analyzing section analyzes the first item of data to produce a first result of analysis. The second command analyzing section analyzes the second item of data to produce a second result of analysis. The page data producing section produces an item of image data by combining the first result of analysis with the second result of analysis.

The image forming apparatus may further include a subsequent data detecting section that detects that a description in data. When the subsequent data detecting section detects a description written in the second command system in the first item of data, the subsequent data detecting section switches from the first command analyzing section to the second command analyzing section.

The image forming apparatus may further include a temporary storing area that holds the second result of analysis when the second command analyzing section has analyzed the second item of data.

The image forming apparatus may further include a non-volatile memory area and a data reading section. The non-volatile memory area holds information previously received from an external host apparatus. The data reading section reads the information from the non-volatile memory section in response to a signal received from an image processing apparatus.

The image forming apparatus may further include a random access memory that receives the information from the non-volatile memory section and holds the received information. When the first command analyzing section and the second command analyzing section begin to analyze the information, the data reading section reads an amount of information at a time into the random access memory.

A printing system incorporates the aforementioned image information processing apparatus and the aforementioned image forming apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIGS. 6A-6D illustrate a print job illustrating the operation of the first embodiment;

FIG. 7 illustrates a printing system according to a second embodiment;

DESCRIPTION OF THE INVENTION

A printing system according to the present invention includes a printer driver and a controller in the form of a CPU. The printer driver includes a language selecting section, a data converting section, and a print job creating section. The controller operates as a job managing section, a first command analyzing means, and an N-th command analyzing means.

First Embodiment

{Configuration }

Figure 1:
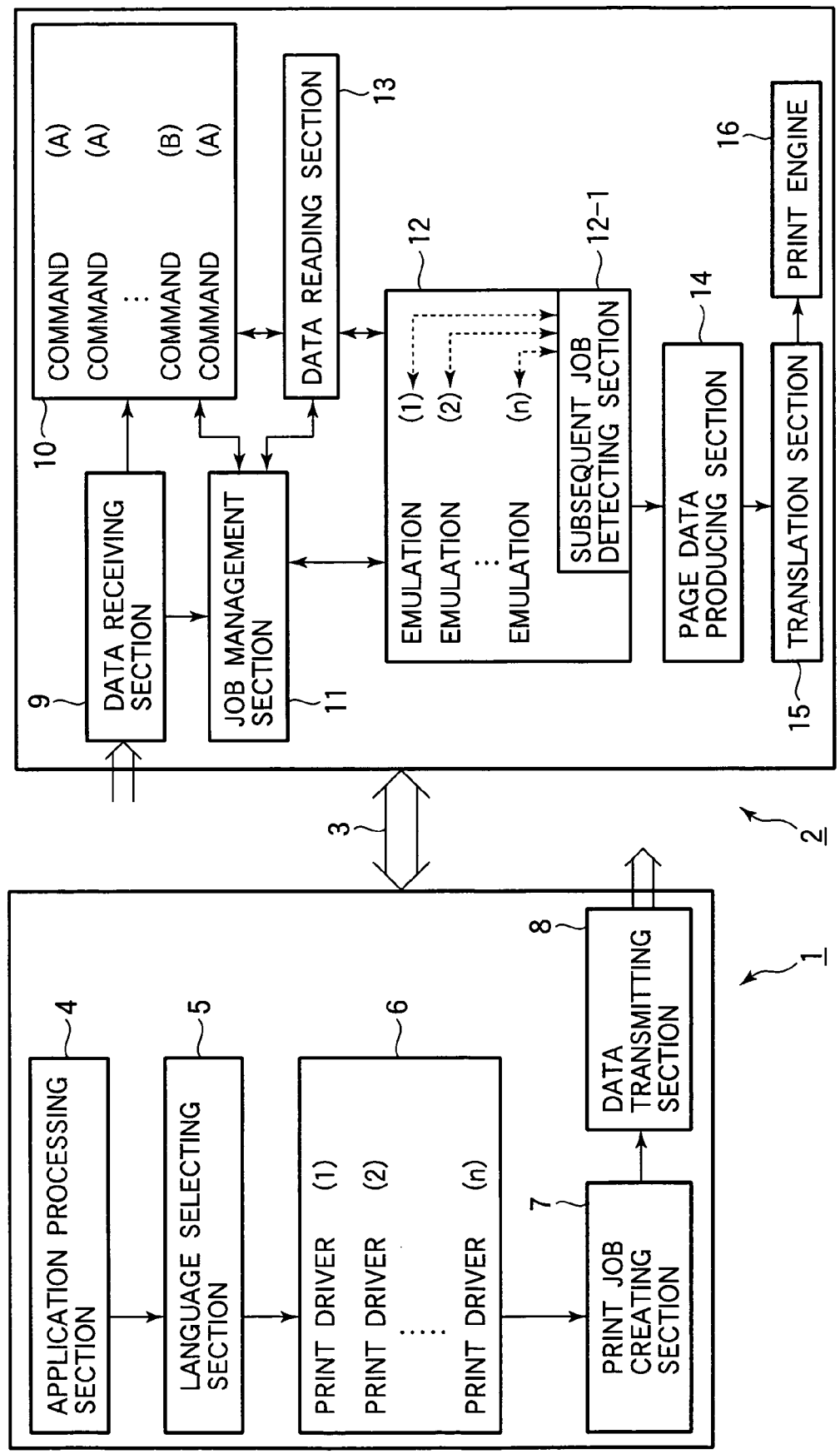
FIG. 1 illustrates a printing system according to a first embodiment.

FIG. 1 illustrates a printing system according to a first embodiment. The printing system includes an information processing apparatus 1, an image forming apparatus 2, and a network 3.

An information processing apparatus 1 includes an application processing section 4, a language selecting section 5, a data converting section 6, a print job creating section 7, and a data transmitting section 8. The information processing apparatus 1 divides print information produced using an application into a predetermined number of portions, and then converts the respective portions into an optimum page-description language (PDL), creating a print job that includes a plurality of items of data written in different command systems. Transmission data that includes this print job is transmitted over the network 3. The information processing apparatus 1 usually takes the form of a personal computer (referred to as PC hereinafter).

Under the control of an operating system (OS) installed in the PC, the application processing section 4 allows an operator to create print information that contains a text and graphics. The application processing section 4 is implemented by the CPU and executes program modules pre-installed in, for example, a hard disk (HDD), not shown, in the PC.

The language selecting section 5 receives print information from the application processing section 4 and analyzes the print information. The language selecting section 5 divides the print information prepared by the operator into a main part (e.g., text) and a subpart (e.g., graphics), and selects optimum page-description languages for the respective parts of the print information. In other words, the language selecting section 5 selects an emulation suitable for the text and another emulation suitable for the graphics. The language selecting section 5 is implemented by the CPU in the PC and executes program modules pre-installed in the printer driver of the PC.

The data converting section 6 converts the main part of the print information into a first command system written in a main page-description language A selected by the language selecting section 5, and the sub part into an N-th command system written in a sub page-description language B selected by the language selecting section 5. The data converting section 6 includes printer drivers (1)-(N) according to corresponding page-description languages, which can be selected by the language selecting section 5. The data converting section 6 is implemented by the CPU in the PC and executes program modules corresponding to the printer driver (1) to printer driver (N).

The print job creating section 7 creates a print job based on data in the first command system, converted in the main page description language A, and data based on the i-th command system, converted in the sub page-description language B. The print job creating section 7 attaches the types of the main page-description language and the sub page-description language to the head of the print job, thereby preparing data to be transmitted. The data converting section 6 is implemented by the CPU in the PC and executes program modules pre-installed in the printer driver of the PC.

{Print Job }

An example of a print job created by the print job creating section 7 will be described.

Figure 2:
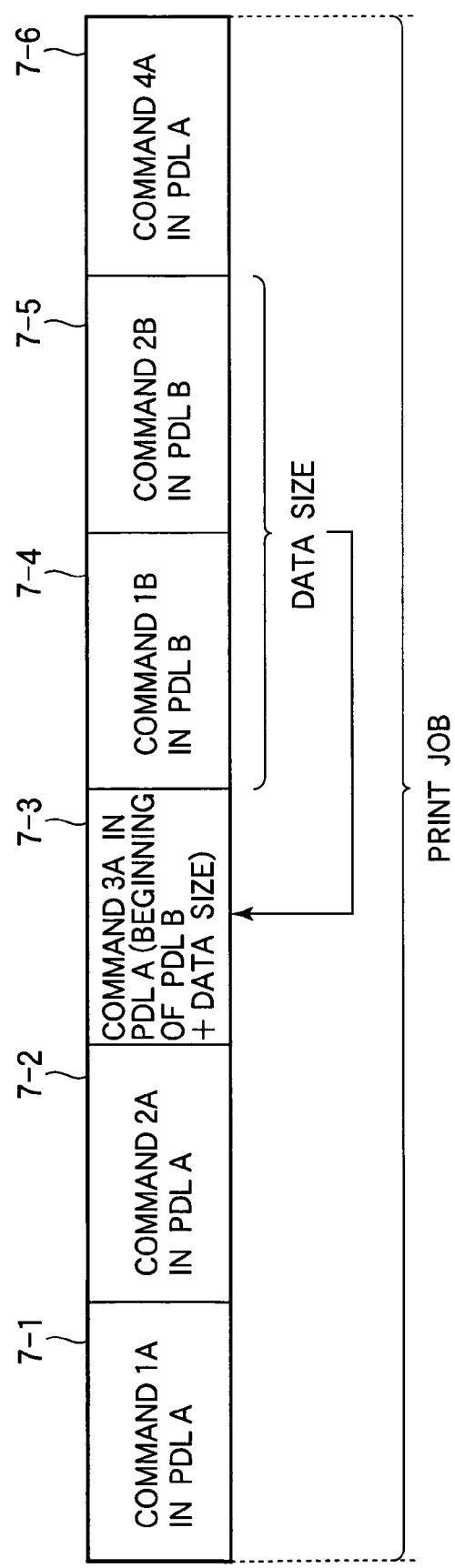
FIG. 2 illustrates an example of structure of a print job.

FIG. 2 illustrates an example of structure of a print job. The print job includes six data blocks 7-1 to 7-6. The data blocks are made up of at least one byte and mostly a plurality of bytes. The data blocks 7-1 to 7-3 are commands 1A-3A, respectively, converted into the main page-description language A. The data blocks 7-4 and 7-5 are commands 1B-2B, respectively, into converted into the sub page-description language B. The data block 7-6 is a command 4A converted into the main page-description language A. The command system of the print job is analyzed to determine which page description language the print job is written in.

The command 3A contains a description indicating that commands (i.e., command 1B and command 2B) written in the sub page-description language B immediately follow command 3A, and a description indicative of a data size (i.e., command 1B+command 2B).

Referring back to FIG. 1, the data transmitting section 8 receives transmission data from the print job creating section 7, and creates a frame by adding an address and a frame check sequence etc., to the top and end of the transmission data according to a protocol of the network 3 over which the transmission data is transmitted to the image forming apparatus 2.

{Image Forming Apparatus}

The image forming apparatus 2 will now be described. The image forming apparatus 2 includes a data receiving section 9, a memory section 10, a job management section 11, emulation processing section 12, data reading section 13, a page data producing section 14, a translation section 15, and a print engine 16. The image forming apparatus 2 receives over the network 3 a frame in which data contains commands of different systems. The image forming apparatus 2 analyzes the data that contains commands of different command systems according to corresponding emulations, then creates print data from the analysis, and finally prints out the data.

The data receiving section 9 receives the frame over the network 3 and stores the print job (FIG. 2) into the memory section 10.

The memory section 10 receives the print job from the data receiving section 9 and stores each of a plurality of sub-sections of data (i.e., each command). For example, the memory section 10 stores commands on a command-by-command basis in the order in which they are received, i.e., command 1A, command 2A, command 1B, command 2B, and command 4A in this order.

The job management section 11 extracts, holds, and manages sub-sections of the data that contains commands of different command systems. In other words, the job management section 11 analyzes the commands in the received print job, thereby identifying the main page description language A and the sub page-description language B of the received print job. The job management section 11 then notifies the emulation processing section 12 for the identified page-description languages A and B, and manages addresses and data sizes of the respective commands stored in the memory section 10. The job management section 11 is implemented by the CPU in the image forming apparatus 2 and executes program modules previously stored in a storage means in the image forming apparatus 2.

The emulation processing section 12 includes a plurality of types of emulations (1)-(n) and a subsequent job detecting section 12-1. The emulation processing section 12 reads the data blocks (i.e., commands) in order from the memory section 10 via the data reading section 13, the data blocks being read on a byte-by-byte basis under instructions and management of the job management section 11. Then, the emulation section 12 analyzes the data blocks by using corresponding emulations. The emulation processing section 12 also analyzes the end portion of the respective data blocks. If the end portion of a data block contains information that the immediately following command contains the sub page-description language B and information on the data size of the following commands, then the emulation processing section 12 switches to another suitable type of emulation according to the sub page-description language B. The emulation processing section 12 is implemented by the CPU in the image forming apparatus 2 and executes program modules previously stored in the storage means in the image forming apparatus 2.

In other words, the job management section 11 notifies the emulation processing section 12 that the received print job is in the page-description language A. In response to the notification, the emulation processing section 12 reads the first command from the memory section 10 and provides emulation of the command according to the main page-description language A. The subsequent job detecting section 12-1 analyzes the command to determine whether the command contains the data size of a following command, and detects whether the following command is written in the sub page description language B. If the command does not contain information on the data size of the following command and information that the following command is written in the sub page-description language B, the emulation processing section 12 continues to analyze the following command according to the main page-description language A. If the command contains the data size of the following command and the information that the following command is in the sub page-description language B, the emulation processing section 12 provides emulation of the following command according to the sub page-description language B.

The page data producing section 14 converts the results of analysis performed by the emulation processing section 12 into an intermediate language. The page data producing section 14 is implemented by the CPU and executes program modules pre-installed in the storage means in the image forming apparatus 2. The translation section 15 translates the content of page drawing, converted into the intermediate language by the page data producing section 14, into bitmap data. Then, the translation section 15 outputs the bitmap data to the print engine 16. The translation section 15 is implemented by the CPU and executes program modules pre-installed in the storage means in the image forming apparatus 2.

The print engine 16 receives the bitmap data from the translation section 15 and prints the bit map data. The network 3 is an information communication network such as LAN over which data can be communicated between the information processing apparatus 1 and the image forming apparatus 2.

{Operation of Image Processing Apparatus}

The operation of the first embodiment will now be described.

Figure 3:
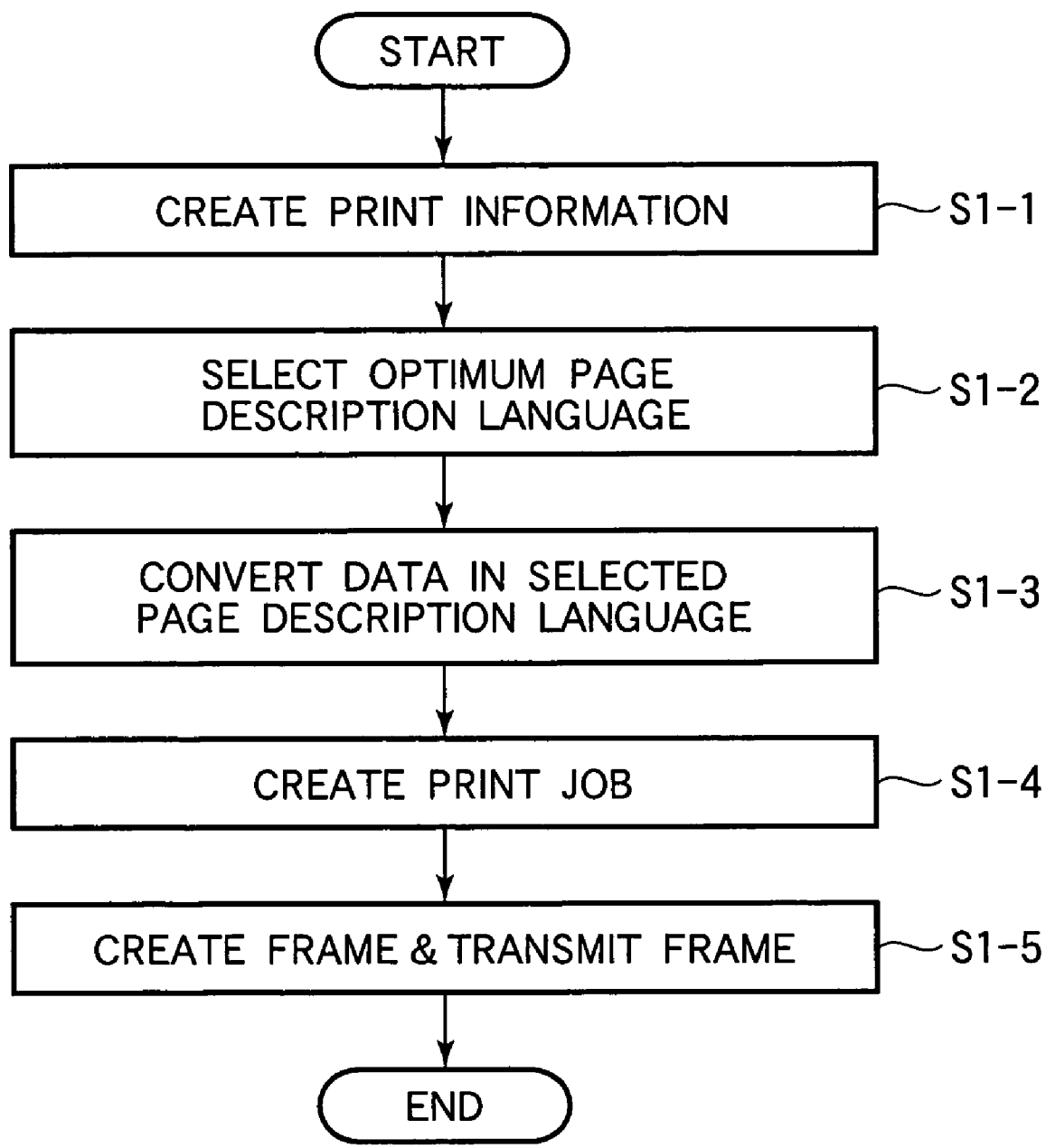
FIG. 3 is a flowchart illustrating the operation of the image processing apparatus.

FIG. 3 is a flowchart illustrating the operation of the image processing apparatus 1.

Step S1-1: The operator creates print information using the application processing section 4, and inputs a request to print the print information.

Step S1-2: The language selecting section 5 receives the print information from the application processing section 4 and divides it into a main portion of the print information and a sub portion. The language selecting section 5 then selects optimum page-description languages for the main and sub portions of the print information, respectively.

Step S1-3: The data converting section 6 converts the main portion of the print information into data based on the first command system by using the mail page-description language A, and the sub portion of the print information into data based on the second command system by using the sub page-description language B.

Step S1-4: The print job creating section 7 creates a print job, described with reference to FIG. 2, using the data based on the first command system and the data based on the second command system. In this manner, the print job creating section 7 produces the transmission data that is transmitted to the image forming apparatus 2.

Step S1-5: The data transmitting section 8 attaches, for example, addresses and a frame check sequence to the head and tail of the transmission data) (FIG. 2), the addresses and frame check sequence complying with the protocol of the network 3. The transmission data is outputted to the image forming apparatus 2 over the network 3. This completes the operation of the image processing apparatus 1.

{Operation of Image Forming Apparatus}

Figure 4:
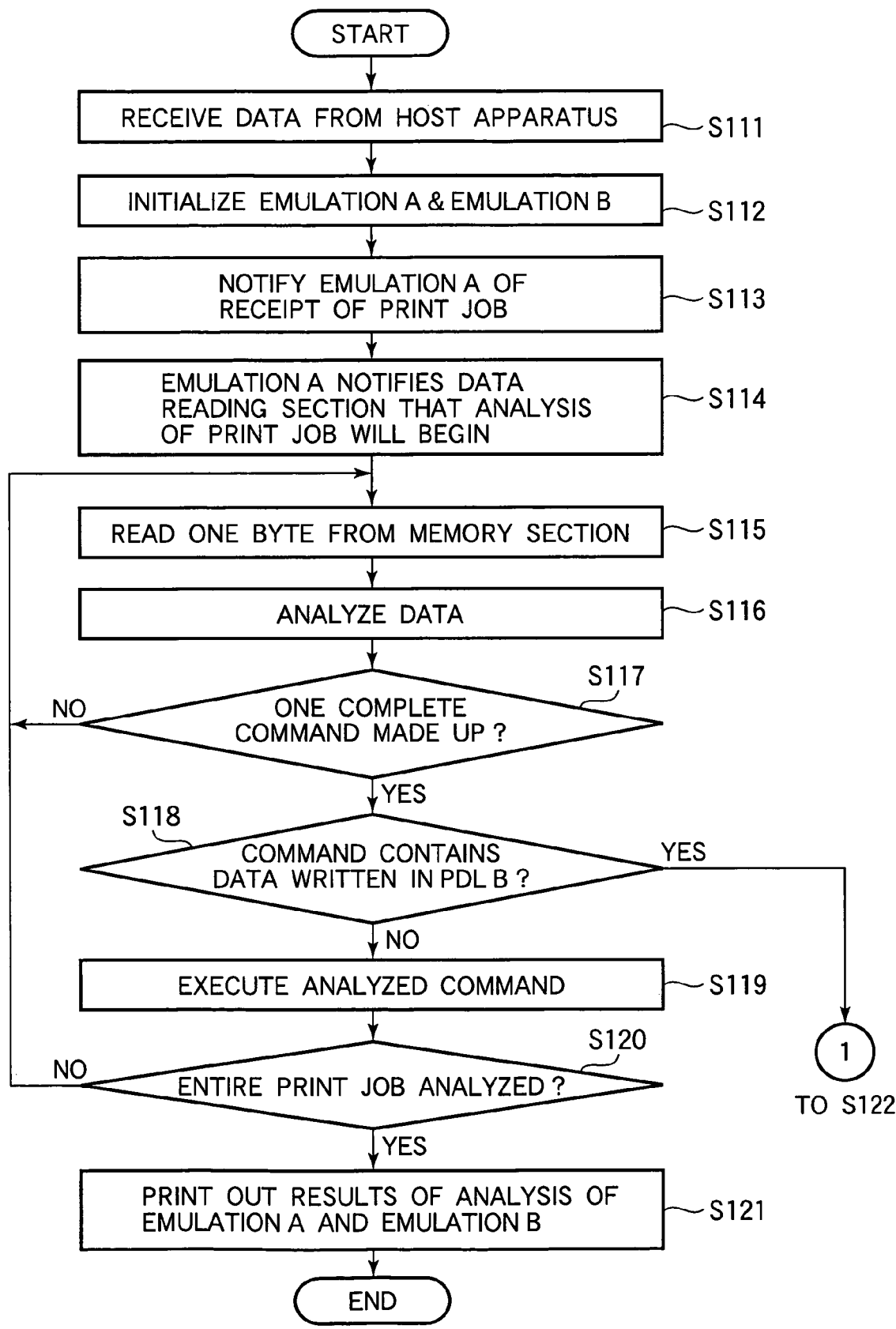
FIG. 4 and FIG. 5 are a flowchart illustrating the operation of the image forming apparatus.
Figure 5:
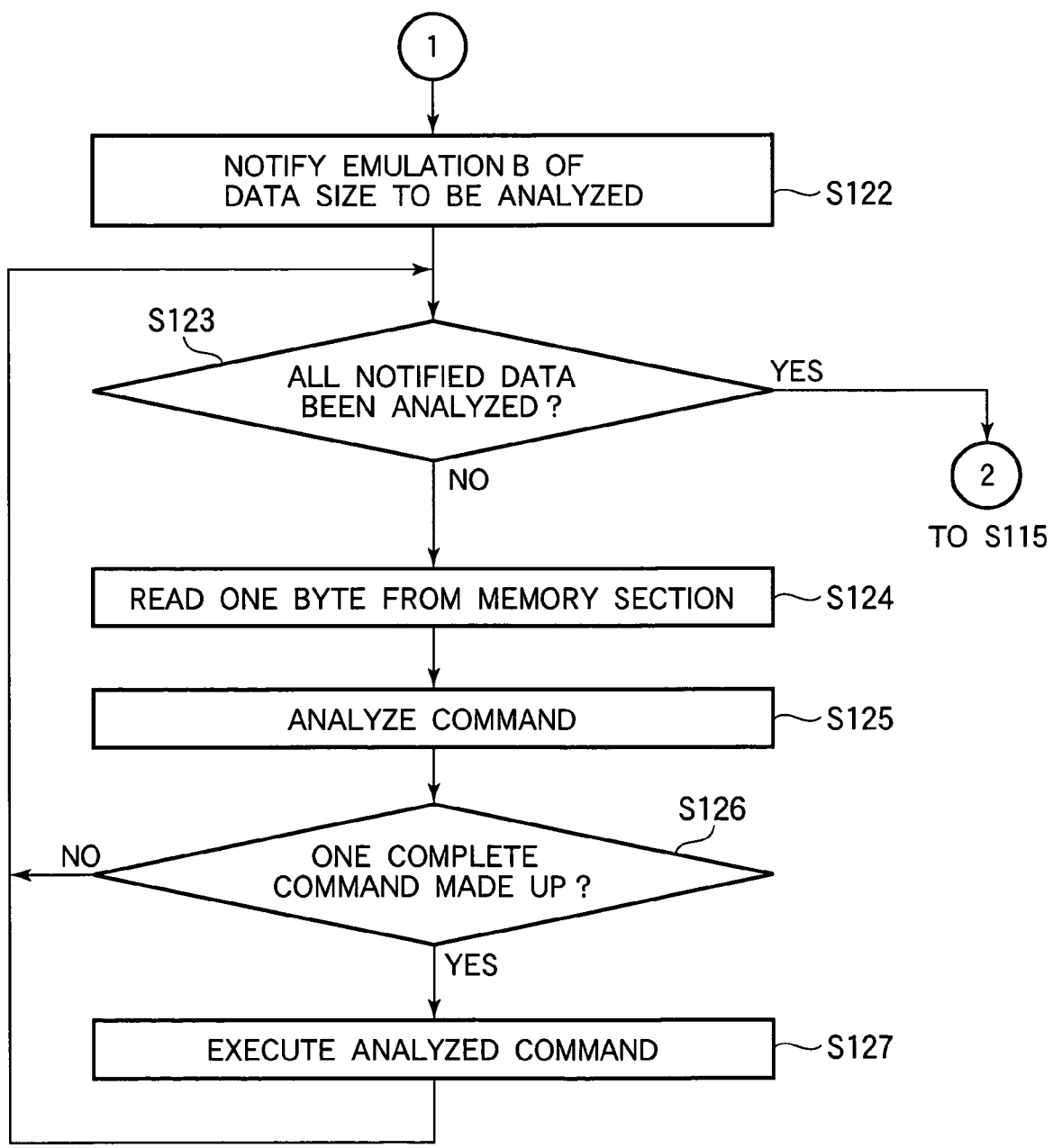

FIG. 4 and FIG. 5 are a flowchart illustrating the operation of the image forming apparatus 2.

FIGS. 6A-6D show a print job illustrating the operation of the first embodiment.

With reference to FIG. 4 and FIG. 5, a description will be given of the operation of the image forming apparatus 2 in which the image forming apparatus 2 receives the transmission data or frame including a print job in FIG. 2 over the network 3 and prints the transmission data. The description will also be given with reference to FIGS. 6A-6D as required. The content of the print job in FIGS. 6A-6D is the same as that in FIG. 2.

Step S111: The data receiving section 9 receives a frame from the network 3, and stores the print job (FIG. 2) into the memory section 10. The data receiving section 9 notifies the job management section 11 of the data size of the print job and an address at which print job is held in the memory section 10. The data receiving section 9 also notifies the job management section 11 of the page control language in which the data is written. The job management section 11 manages the data size of the print job and address at which the print job is stored in the memory section 10.

Step S112: The emulation A and emulation B are initialized.

The job management section 11 notifies an appropriate one of the emulations (1)-(n) that the print job has been received, the notified emulation providing emulation in the main page-description language A.

The emulation that analyzes commands written in the main page-description language A will be referred to as emulation A hereinafter.

The job management section 11 also notifies an appropriate one of the emulations (1)-(n) that the print job has been received, the notified emulation providing emulation in the main page-description language B. The emulation that analyzes commands written in the main page-description language B will be referred to as emulation B hereinafter.

Step S113: The emulation A notifies the data reading section 13 that the analysis of the print job will begin. The data reading section 13 refers to the job management section 11 for obtaining an address at which the first command (i.e., command 1A in FIG. 6A) is stored in the memory section 10, thereby becoming ready to read data blocks from the memory section 10 on a byte-by-byte basis.

Step S114: The emulation A notifies an appropriate one of the emulations (1)-(n) that the print job was received, the notified emulation being capable of performing emulation in the page-description language B.

Figure 6A:
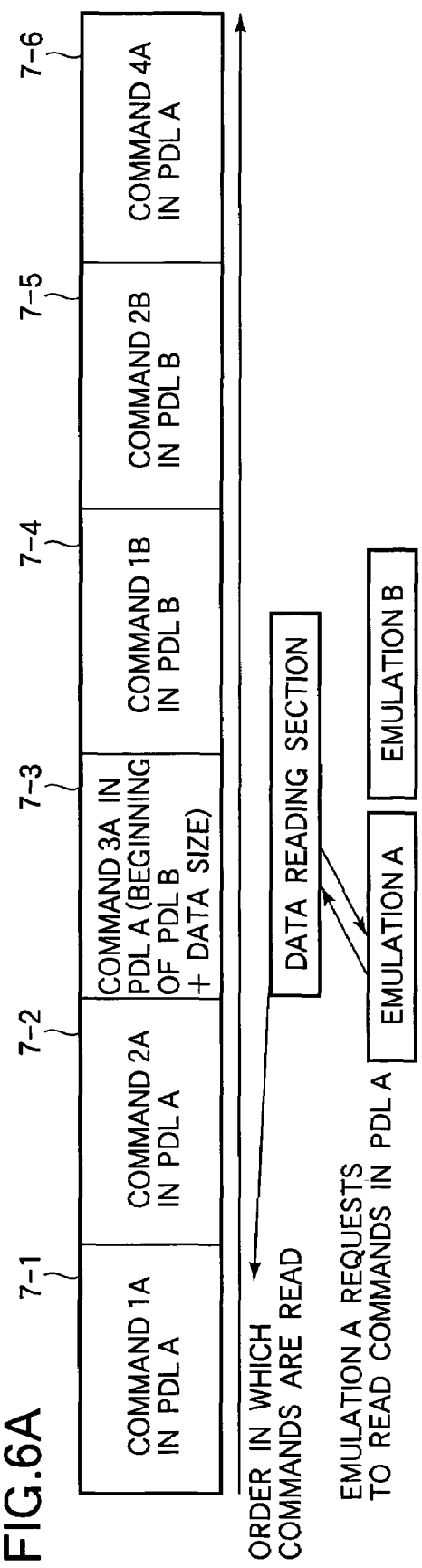

Step S115: The emulation A controls the data reading section 13 to read from the memory section 10 one of the bytes that form the data block. Here, because the initial command in the print job is in the page description language A, the emulation A reads command 1A (FIG. 6A).

Step S116: The emulation A performs the analysis of the command.

Step S117: A decision is made to determine whether the data blocks read through the data reading section 13 make up one complete command. If YES, then the program proceeds to steps S120. If NO, the program jumps back to step S115 to repeat steps S115 through S119 until the analysis of data blocks for one complete command have been completed.

Step S118: A decision is made to determine whether the following command contains the sub page-description language B, and to detect the data size of the following commands. The subsequent job detecting section 12-1 checks the end portion of the command currently being processed to detect the data size of the following commands and to determine whether the following command contains the sub page-description language B.

If NO, then the program proceeds to step S119.
If YES, the program proceeds to step S122.

Here, because the subsequent job detecting section 12-1 fails to detect the sub page-description language B and the data size in command 1A, the program proceeds to steps S119.

Step S119: The emulation A executes the analyzed command.

Step S120: A decision is made to determine whether the analysis of the entire print job has completed.

If YES, then the program proceeds to step S121 and then ends.

If NO, the program loops back to step S115.

Because the analysis of the print job has not been completed yet at this print job, the program proceeds to step S115. The emulation A repeats the step S115 through step S118 to analyze command 2A. The emulation A further repeats the step S115 through step S118 to analyze command 3A. Then, the subsequent job detecting section 12-1 detects at step S118 information inserted at the end portion of command 3A, the information describing that the immediately following command is in the sub page-description language B. The information inserted at the end portion of command 3A also describes the data size of the following commands written in sub page-description language B.

Figure 6B:
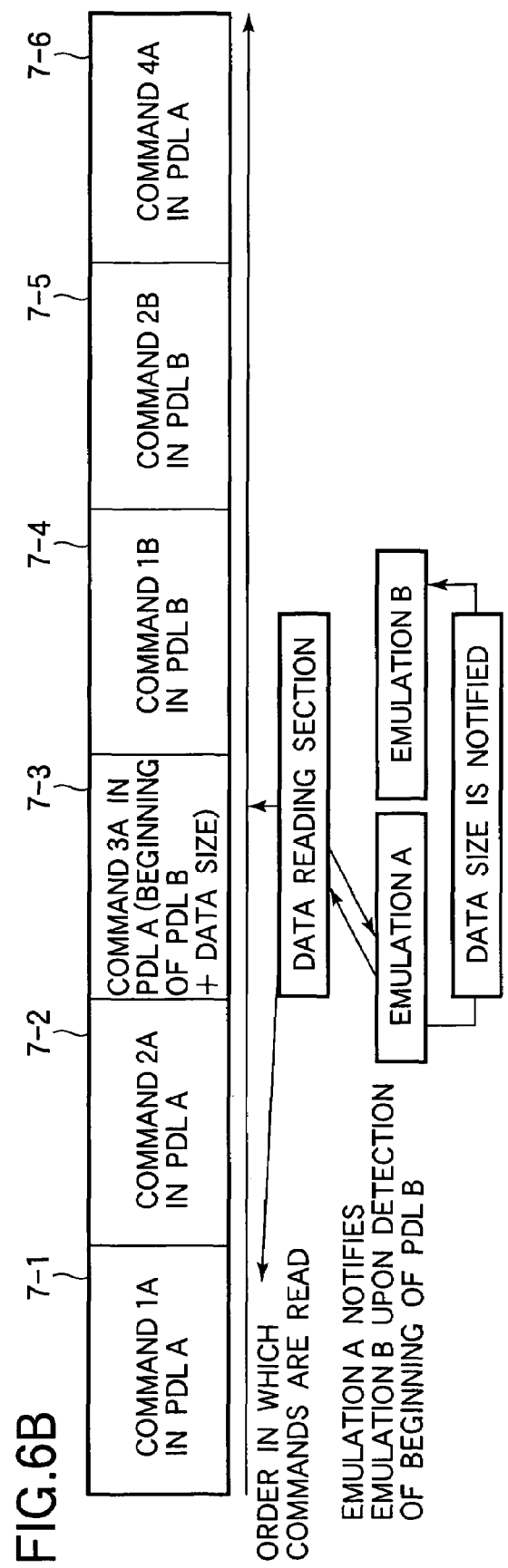

Step S122: The emulation A notifies the emulation B of the data size to be analyzed by the emulation B. The emulation B saves the data size. Here, the data size is two commands, i.e., command 1B and command 2B (FIG. 6B).

Step S123: A decision is made to determine whether the analysis of the data having a notified data size has been completed.

If YES, the program jumps to step S115.
If NO, then the program proceeds to step S124.

Here, because the analysis of the data has not been completed yet, the program proceeds to step S124.

Step S124: The emulation B reads one of the bytes that form the command through the data reading section 13. Here, the emulation B reads a command 1B (FIG. 6C).

Step S125: The emulation B performs the analysis of the byte.

Step S126: A decision is made to determine whether the bytes read through the data reading section 13 make up one complete command.

If NO, the program jumps back to step S123 to repeat steps S123 to S126 until the analysis of one complete command has been completed.

If YES, the program proceeds to step S127.

Here, upon completion of command 1B, the program proceeds to step S127.

Step S127: The emulation B executes the analyzed command.

Step S121: The results of analysis by the emulation A and emulation B are printed as an item of image data and then the program ends.

Likewise, the program cycles through the flowchart to analyze command 2B (FIG. 6A) following command 1B. The emulation B analyzes command 2B by repeating steps S123 to S126, and then returns to step S115 through step S123. Then, the emulation A analyzes a command 4A by repeating steps S115 to S119, and then returns to step S115. Then, the program ends through step S117.

Even if a print job contains graphics inserted at some locations in a page of a long text, the first embodiment allows printing of the print job without a page divided into separate pages. The graphics and text are properly laid on a page.

While the first embodiment has been described with respect to a print job that contains the main page-description language A and the sub page-description language B, the invention is not limited to this case. The present invention is applicable to a print job that contains a plurality of page-description languages, i.e., a main page-description language A, sub page-description language, a sub page-description language C, a sub page-description language and so on.

Second Embodiment

A print job includes commands A expressed in the main page-description language A and commands B expressed in the sub page-description language B. The print job may contain a command B having a length larger than a predetermined size of data block of a print job. A second embodiment addresses this case.

{Configuration}

FIG. 7 illustrates a printing system according to the second embodiment. Referring to FIG. 7, the printing system includes an information processing apparatus 1, an image forming apparatus 22, and a network 3. Elements similar to those in the first embodiment have been given the same reference numerals and the description thereof is omitted.

The image forming apparatus 22 includes a data receiving section 9, a memory section 10, job management section 11, emulation processing section 23, data reading section 13, page data producing section 14, translation section 15, and print engine 16. The image forming apparatus 22 receives over the network 3 a frame in which data contains commands of different command systems. The image forming apparatus 22 then analyzes the data that contains commands of different command systems according to corresponding emulations, then creates print data from the analysis, and finally prints out the print data.

The emulation processing section 23 includes a plurality of types of emulations (1)-(n), subsequent job detecting section 12-1, and a temporary storing area 23-1. The emulation processing section 12 reads the data blocks (i.e., commands) in order from the memory section 10 via the data reading section 13 under instructions and management of the job management section 11, and analyzes the data blocks by using corresponding emulations. The emulation processing section 12 also analyzes the end portions of the respective data blocks. If the end portion of a data block contains information on the data size of the following commands and information that a following command is written in the sub page-description language B, the emulation processing section 12 switches to another suitable one of the plurality of emulations (1)-(n) capable of performing emulation in the sub page-description language B.

The temporary storing area 23-1 holds the result of analysis when a data block expressed in the sub page-description language B is analyzed. The temporary storing area 23-1 is implemented by a CPU in the image forming apparatus 22 and executes program modules pre-installed in, for example, a hard disk, not shown, in the image forming apparatus 22.

{Print Job}

Figure 8:
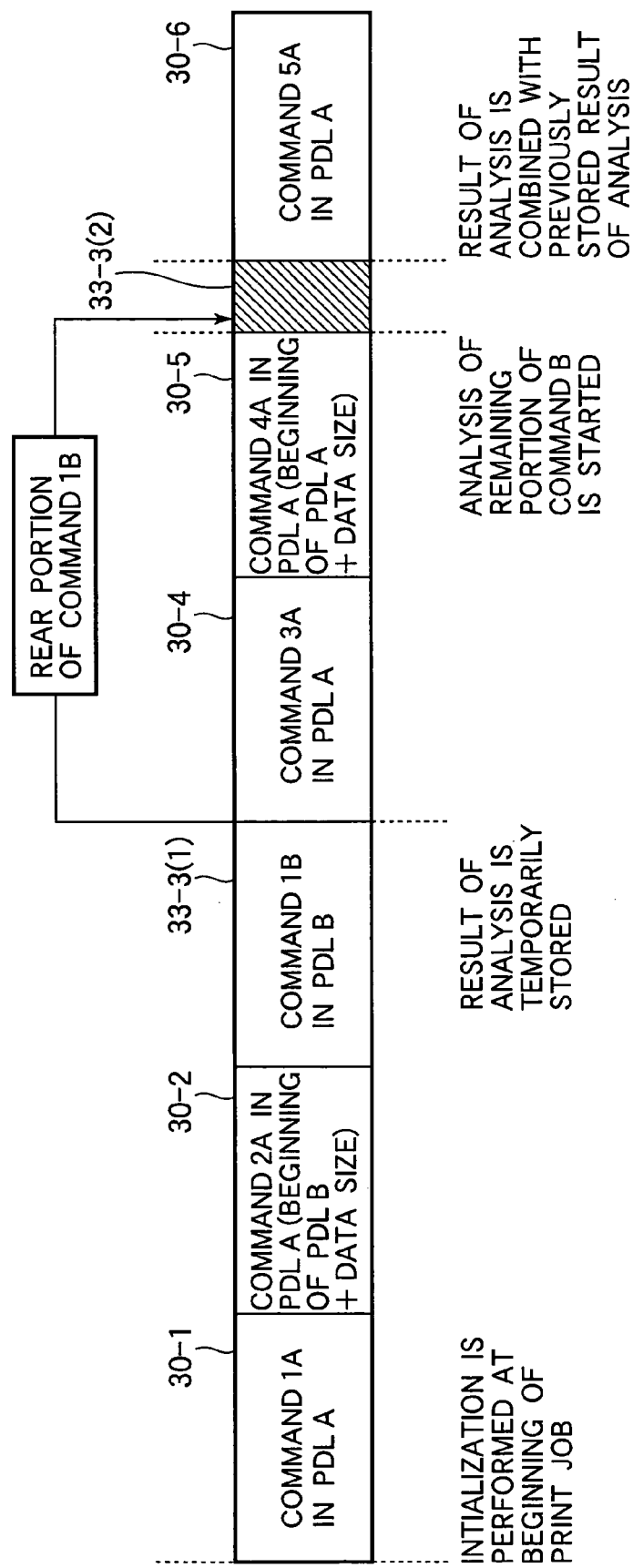
FIG. 8 illustrates an example of the structure of print job according to the second embodiment.

FIG. 8 illustrates an example of the structure of print job according to the second embodiment. Referring to FIG. 8, the print job includes a command 1B inserted between commands expressed in the main page-description language A. Command 1B has a length larger than a predetermined size of data block of a print job.

The print job contains six data blocks 30-1, 30-2, 33-3(1), 30-4, 30-5, and 30-6 and a data block 33-3(2) shorter than a complete one data block. The data blocks 30-1, 30-2, 30-4, 30-5, 30-6 are a command 1A, command 2A, and command 3A, command 4A and command 5A, respectively, which are written in the main page-description language A. The data block 33-3(1) is a front portion of command 1B and the data block 33-3 (2) is a rear portion of command 1B. The data blocks 33-3(1) and 33-3(2) are written in the main page-description language B.

As shown in FIG. 8, the front portion of command 1B is inserted between command 2A and command 3A. The rear portion of command 1B is inserted between command 4A and command 5A. Information on an immediately following data block is inserted in a end portion of a command written in the main page-description language A that immediately precedes a command written in the sub page-description language B. The Information describes that the immediately following data block contains the sub page-description language B. The information also describes the data size. The end portion of command 2A describes the data size of the block 33-3(1), the front portion of command 1B. The end portion of command 3A describes the data size of the block 33-3(2), the rear portion of command 1B.

Figures 9, 10:
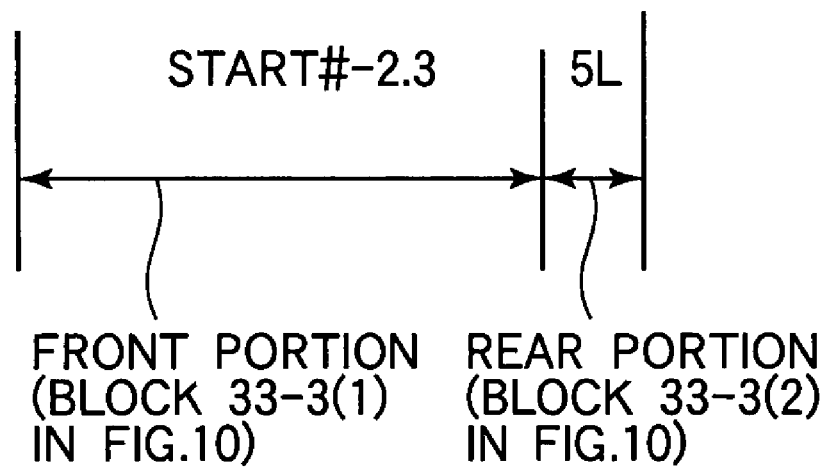
FIG. 9 and FIG. 10 illustrate the content of the temporary storing area when command 1B is analyzed.

FIG. 9 and FIG. 10 illustrate the content of the temporary storing area 23-1 when command 1B is analyzed. Assume that command 1B is "START#-2.35L" which indicates that the starting position of printing is moved leftward by 2.35 mm. FIG. 9 illustrates an example of the temporary storing area 23-1. FIG. 10 illustrates the front portion of command 1B and the rear portion of command 1B. The data block 33-3(1) holds the front portion, i.e., "START#-2.3" and the data block 33-3(2) holds the rear portion, i.e., "5L."

When the analysis of the data block 33-3(1) in FIG. 8 has been completed, the result of analysis in FIG. 9 is retained. Referring to FIG. 9, a mode 40-1 represents whether command 1B is being analyzed. If the analysis is being performed, the mode area 40-1 holds "ANALYSIS NOT COMPLETED." When the analysis has been completed, "ANALYSIS COMPLETED" is stored into the mode 40-1. When the data block 33-3(1) has just been analyzed and the data block 33-3(2) has not analyzed yet, "ANALYSIS NOT COMPLETED" is stored into the category 40-1. The table area 40-2 shows the number of a table (one of a plurality of tables provided for analysis). The table number is "7" in this example.

An integer area 40-3 indicates the integer of "START#-2.35L," i.e., "2" and a fraction area indicates the fraction of "START#-2.35L," i.e., "3." A sign area 40-5 indicates the sign of "START#-2.35L," i.e., "-." The analysis of the command "START#-2.35L" is complete when the analysis of the data block 33-3(2) has been completed. The mode area 40-1 now holds "ANALYSIS COMPLETED" and the fraction area 40-4 holding "35."

{Operation of Image Forming Apparatus}

The operation of the image forming apparatus 22 according to the second embodiment will now be described with reference to FIGS. 11, 12, and 8.

Figure 11:
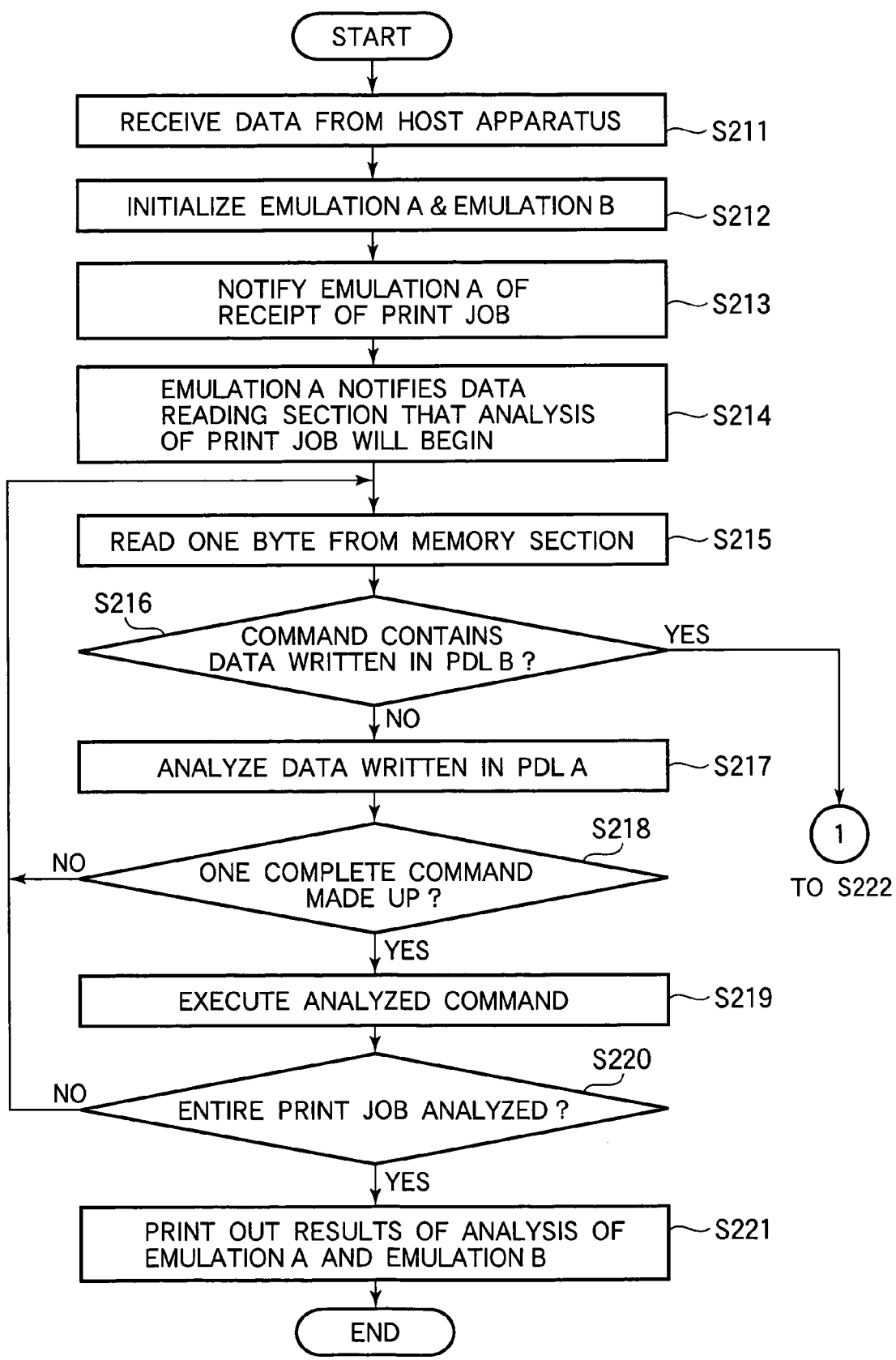
FIG. 11 is a first flowchart illustrating the operation of the second embodiment.
Figure 12:
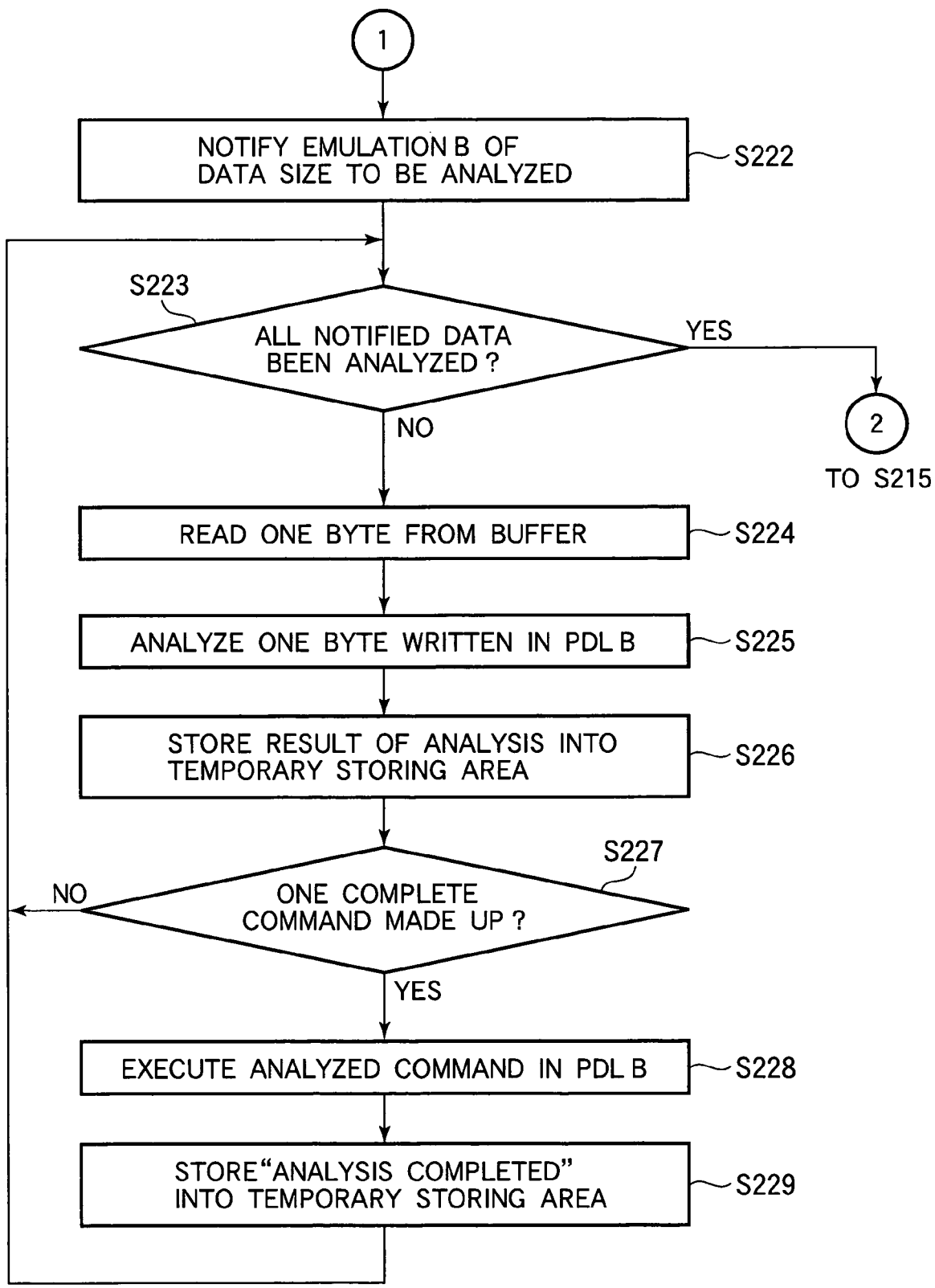
FIG. 12 is a second flowchart illustrating the operation of the second embodiment.

FIG. 11 is a first flowchart illustrating the operation of the second embodiment. FIG. 12 is a second flowchart illustrating the operation of the second embodiment.

A description will be given of the operation when the image forming apparatus 22 receives the data in FIG. 8 over the network 3 and prints out the data.

Step S211: The data receiving section 9 receives a frame over the network 3, and stores the print job (FIG. 2) into the memory section 10. The data receiving section 9 notifies the job management section 11 of the data size of the print job and an address at which the print job is held in the memory section 10. The data receiving section 9 also notifies the job management section 11 of the page control language in which the data is written. The job management section 11 manages the data size of the print job and the address at which the print job is held in the memory section 10. The job management section 11 determines in which of page-description languages A and B the data blocks are written.

Step S212: The emulation A and emulation B are initialized. Alternatively, the initialization of the emulation may be deferred until immediately before the emulation needs to operate. For example, the emulation B may be initialized at step S211, which will be described later.

The job management section 11 notifies an appropriate one of the emulations (1)-(n) that the print job has been received, the notified emulation being capable of providing emulation in the main page-description language A.

The emulation that analyzes commands written in the main page-description language A will be referred to as emulation A hereinafter. The job management section 11 also notifies an appropriate one of the emulations (1)-(n) that the print job has been received, the notified emulation being capable of providing emulation in the main page-description language B. The emulation that analyzes commands written in the main page-description language B will be referred to as emulation B hereinafter.

Step S213: The emulation A notifies the data reading section 13 that the analysis of the print job will begin. The data reading section 13 refers to the job management section 11 to obtain an address at which the first data block 30-1 stored in the memory section 10, thereby becoming ready to read data blocks on a byte-by-byte basis. Each block is made up at least one byte and usually a plurality of bytes.

Step S214: The emulation A notifies an appropriate one of the emulations (1)-(n) that the print job was received, the notified emulation being capable of performing emulation in the page-description language B.

Step S215: The emulation A controls the data reading section 13 to read a data block (i.e., one byte of data) from the memory section 10. Here, one of the bytes that form the data block 30-1 is read.

Step S216: A decision is made to determine whether an immediately following command contains the sub page-description language B, and to detect the data size of the following commands. The subsequent job detecting section 12-1 checks the end portion of the command currently being processed to detect the data size of the following commands, and to determine whether an immediately following command contains the sub page-description language B.

If the subsequent job detecting section 12-1 fails to detect the sub page-description language B and the data size, then the program proceeds to step S217.

If the subsequent job detecting section 12-1 detects the sub page-description language B and the data size, the program proceeds to step S222.

Here, because the data block 30-1 is being analyzed, the subsequent job detecting section 12-1 fails to detect the sub page-description language B and the data size in command 1A. Thus, the program proceeds to steps S217.

Step S217: The emulation A performs the analysis of the command.

Step S218: A decision is made to determine whether the data blocks read through the data reading section 13 make up one complete command.

If NO, then the program jumps back to step S215 to repeat steps S215 through S218 until one complete command has been analyzed.

If YES, then, the program proceeds to steps S219.

Step S219: The analyzed command is executed. Then, the program proceeds to step S220.

Step S220: A decision is made to determine whether the analysis of the entire print job (i.e., all the commands) has completed.

If YES, the program proceeds to step S221 and then ends.

If NO, the program jumps back to step S215. Because the analysis of the print job has not been completed yet, the program proceeds to step S2-5. The emulation A repeats the step S215 through step S218 to analyze the data block 30-2 (i.e., command 2A).

Step S222: The emulation A notifies the emulation B of the data size to be analyzed. The emulation B holds the data size. Here, the data size is the size of the data block 33-3(1), i.e., the front portion of command 1B.

Step S223: A decision is made to determine whether the analysis of the data notified at step S222 has been completed.

If YES, the program proceeds to step S215.

If NO, the program proceeds to step S214.

Here, because the analysis of the data notified at step S222 has not been completed yet, the program proceeds to step S224.

Step S224: The emulation B controls the data reading section 13 to read one byte of data. Here, one of the bytes that form the data block 33-3(1) is read.

Step S225: The emulation B analyzes the one byte of data.

Step S226: The result of analysis at S215 is stored as one of the items (40-1 to 40-5 in FIG. 9) into the temporary storing area 23-1. The result of analysis may be stored concurrently with performing the analysis.

Step S227: The information stored in the temporary storing area 23-1 is checked to determine whether the analysis of one complete command has been completed.

If YES, the program proceeds to step S228.

If NO, the program jumps back to step S223 so as to repeat steps S223 through step S227 until the analysis of one complete command has been completed. Here, because the analysis of command 1B has not been completed yet, the program proceeds to step S223.

Even though the analysis of the data notified at step S222 has been completed, the bytes read through the data reading section 13 may not make up one complete command if the command is longer than a predetermined length of command. This can happen when command 1B is analyzed. If this is the case, the answer at step S223 is YES after the analysis of the block 33-3(1) has been completed. The program jumps back to step S213 and then passes through step S215 to step S222. Then, the program proceeds to step S229 after step S228.

Step S228: The command analyzed by the emulation B is executed.

Step S229: Because the analysis of command 1B has been completed, the mode area 40-1 of the temporary storing area 23-1 is "ANALYSIS COMPLETED".

Then, the steps S215 through S220 are repeated to perform the analysis of the data block 30-6 (i.e., command 5A). Subsequently, the program returns to step S220 and then ends.

Step S221: The results of analysis performed by the emulation A and emulation B are combined into one item of image data. Then, the program ends.

As described above, when a command written in the page-description language B has a data size larger than a predetermined size of command, the result of analysis of the front portion of the command is stored temporarily and the result of analysis of the rear portion of the command can be combined with that of the front portion, thereby making up one complete command. This implies that commands do not have to be the same length. This increases the degree of freedom in the structure of a frame to be sent from an image processing apparatus to an image forming apparatus.

Third Embodiment

{Configuration}

Figure 13:
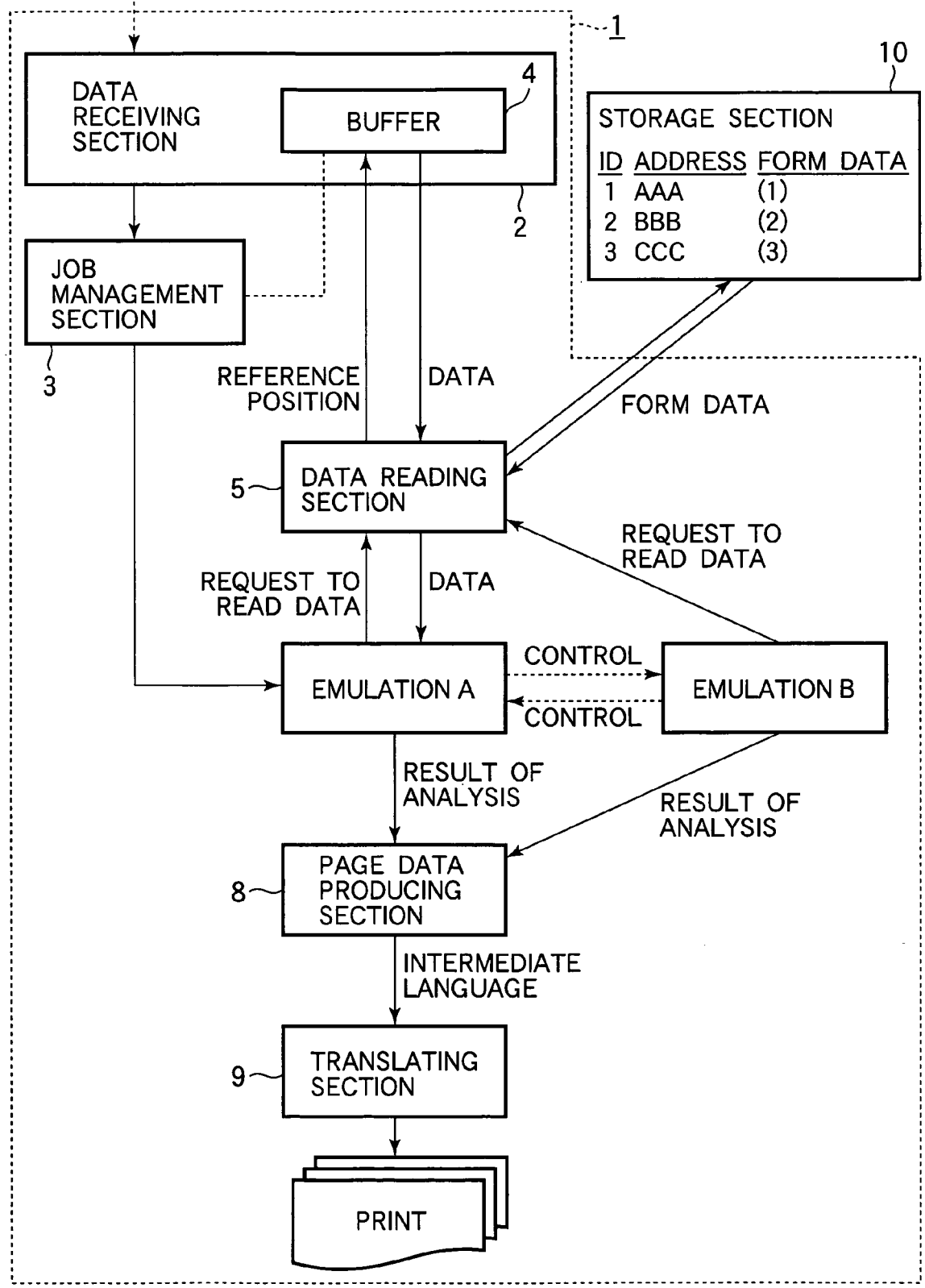
FIG. 13 illustrates a printer according to a third embodiment.

FIG. 13 illustrates a printer 1 according to a third embodiment.

A data receiving section 2 receives a frame from a host apparatus over the network 3. The frame includes a plurality of data blocks in sequence, the data blocks forming commands of different command systems. The received frame is stored into a buffer 4 on a command-by-command basis (i.e., respective data blocks).

A job management section 3 handles respective data blocks as a print job, the data blocks being written in page-description languages.

A data reading section 5 reads the data blocks from the buffer 4 in response to the requests from an emulation A and an emulation B.

The data reading section 5 merely reads the print data from the buffer 4 or the form data from the storage section 10 irrespective of whether the data being currently read is written in the main page-description language A or in a sub page-description language B. Thus, even though the emulation is switched from one to another, the data reading section 5 is not notified.

The emulation A and emulation B analyze the data blocks written in their corresponding page-description languages, and send the results of analysis to a page data producing section 8.

The page data producing section 8 receives the results of analysis from the emulation A and emulation B, and then converts the results of analysis such as characters and graphics into an intermediate language.

A translating section 9 translates all of the contents expressed in the intermediate language into dot data, and prints the dot data. A storage section 10 is a non-volatile external storage apparatus such as a hard disk (HDD) connected to the printer 1. The storage section 10 stores a plurality of items of data such as authenticated print data, fonts, and form data that are previously downloaded from a host apparatus. Authenticated print data has a password attached to it. The authenticated data is stored in, for example, the hard disk. When an operator inputs a password through an operation panel, the authenticated data is printed.

{Structure of Frame}

The frame begins with command 10A, followed by commands 11A, 12A, and 13A in this order. All of commands 10A-13A are written in a main page-description language A.

Figure 14:
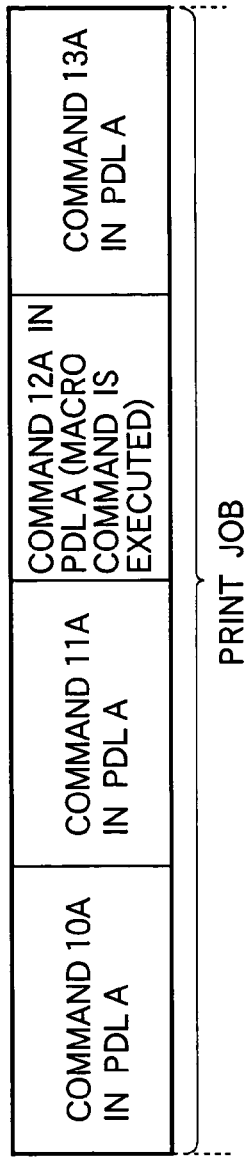
FIG. 14 illustrates a specific example data structure of the print job in the frame.

FIG. 14 illustrates a specific example data structure of the print job in the frame. The print job is a sequence of commands in the received frame.

Figure 15:
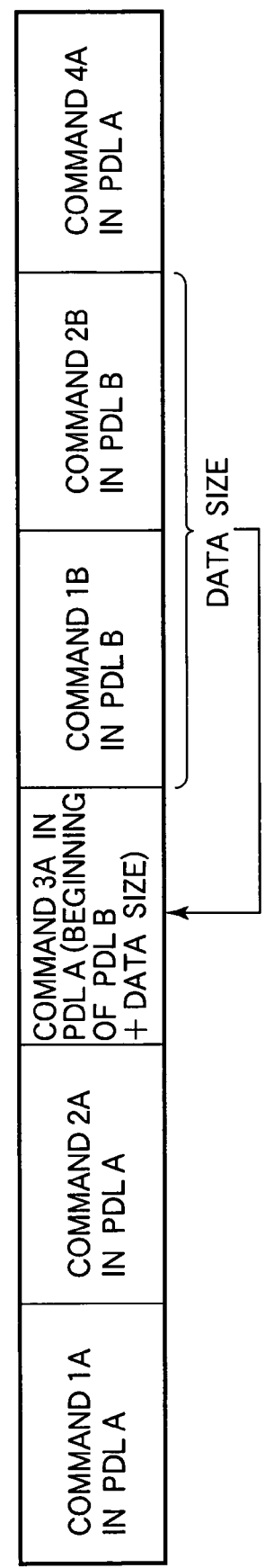
FIG. 15 illustrates an example of the data structure of form data.

FIG. 15 illustrates an example of the data structure of form data.

Form data is a part of table data stored in, for example, the HDD, and describes a table frame only. A table data can be printed by writing the form data over numerical data.

{Reading Print Job}

FIGS. 16-23 illustrate the commands of a print job written in the page-description language A and the page-description language B when the commands are read from the buffer 4 or the HDD.

Figure 16:
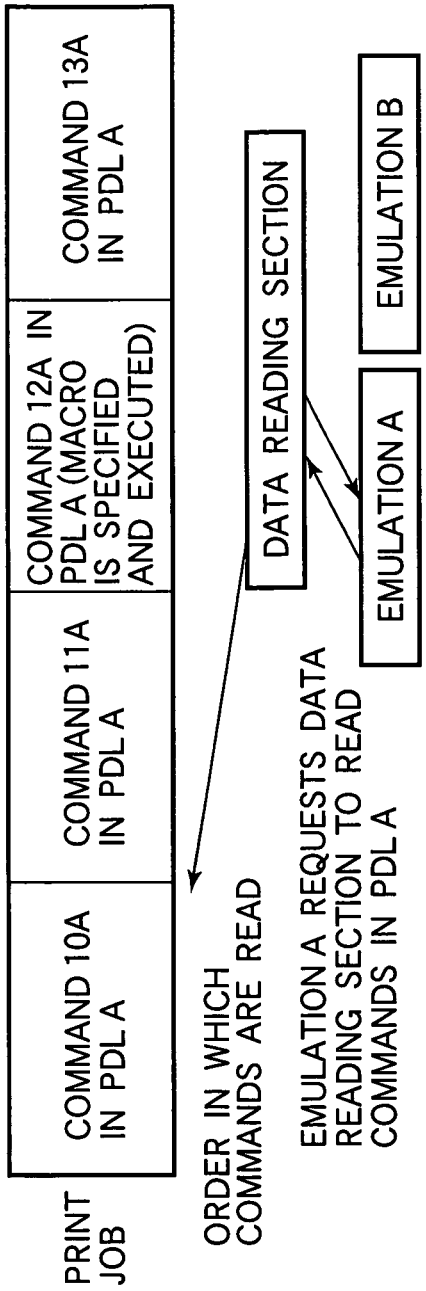
FIG. 16 illustrates the commands when the data reading section initiates reading of the print job in FIG. 14 from the buffer.

FIG. 16 illustrates the commands when the data reading section 5 initiates reading of the print job in FIG. 14 from the buffer 4. Because the print job begins with command 10A written in the page-description language A, the emulation A controls the data reading section 5 to read commands written in the page-description language A from the buffer 4.

The data reading section 5 reads commands 10A and 11A in order.

Figure 17:
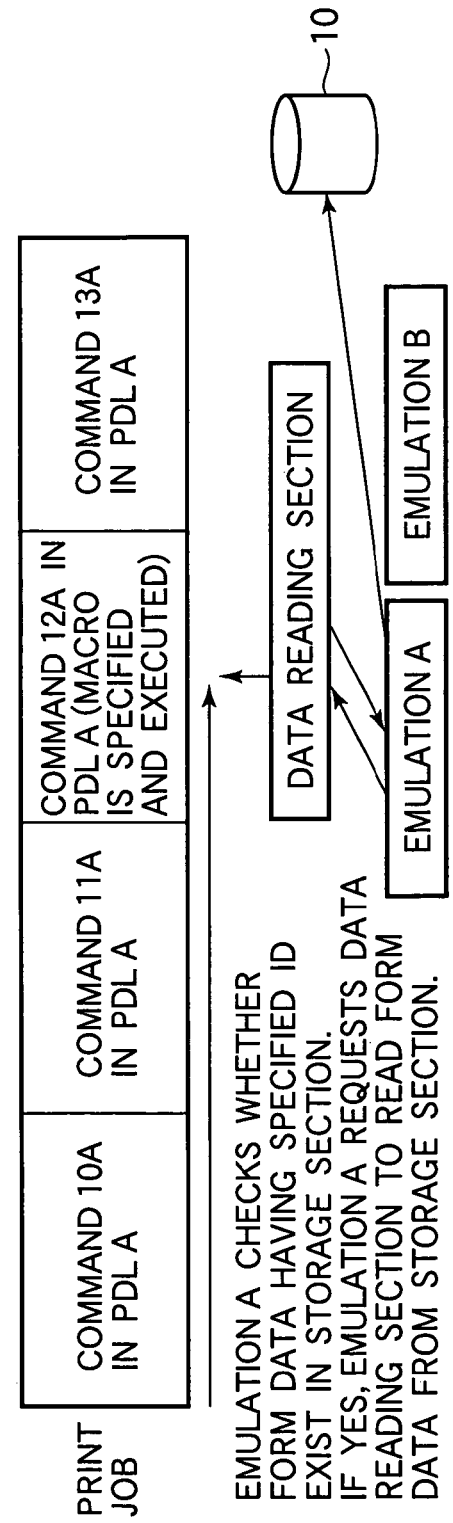
FIG. 17 illustrates a command written in the page-description language A.

FIG. 17 illustrates command 12A written in the page-description language A. Command 12A specifies a macro (ID number of form data, e.g., ESC mcr ID=17) and executes the macro. The emulation A checks the storage section 10 to determine whether the specified form data (ID=17) exists in the storage section 10. If the specified form data is found in the storage section 10, the emulation A controls the data reading section 5 to read the specified form data from the storage section 10.

{Reading Form Data}

Figure 18:
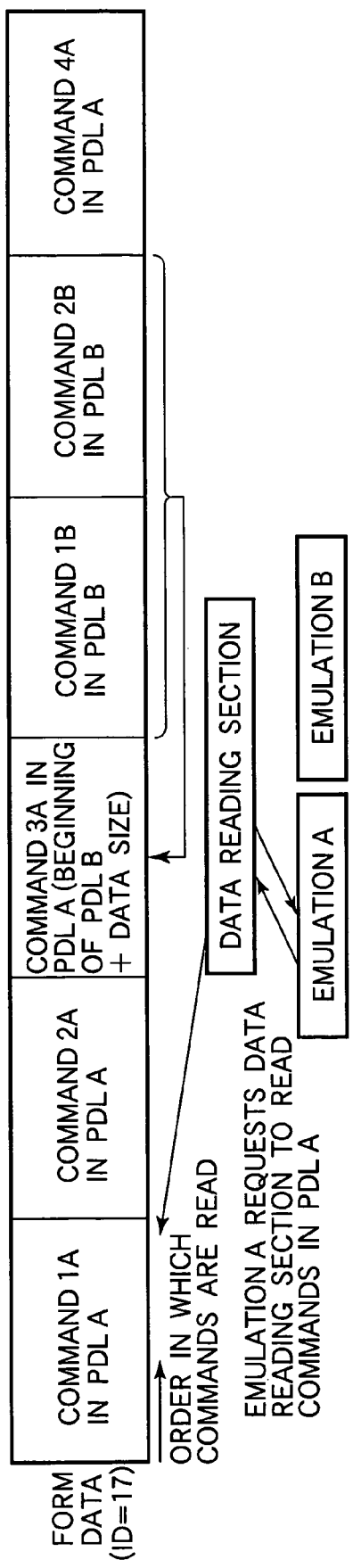
FIG. 18 illustrates the detail of the form data specified by a command.

FIG. 18 illustrates the detail of the form data specified by command 12A.

The emulation A controls the reading section 5 to read the commands written in the page-description language A. The reading section 5 reads command 1A and command 2A in order. Depending on the content of command 12A, the form data in FIG. 18 may begin with a command written in the page-description language B. The form data is analyzed to determine whether the form data is written in the page-description language A or in the page-description language B. The data reading section 5 initiates reading of the form data according to a detected page-description language.

Figure 19:
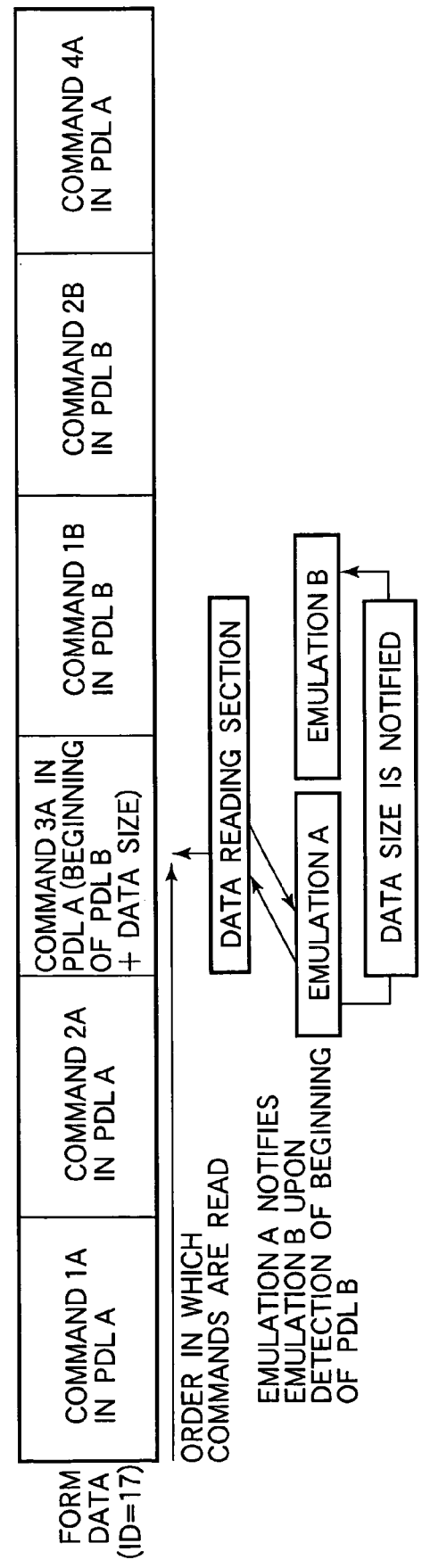
FIG. 19 illustrates the commands when a command is read.

FIG. 19 illustrates the commands when command 3A is read. Command 3A describes that an immediately following command contains the page-description B, and the data size of the following commands.

When command 3A is detected, the emulation A notifies the emulation B of the data size written in the page-description language B (i.e., command 1B and command 2B).

Figure 20:
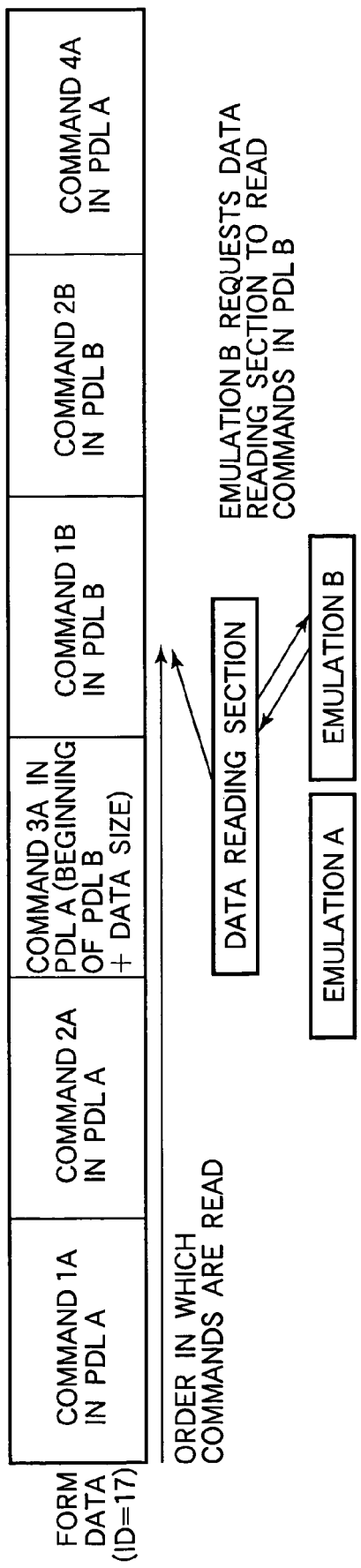
FIG. 20 illustrates the commands when the reading section reads a command 1B written in the page-description B shortly after the detection of a command in the page-description language A.

FIG. 20 illustrates the commands when the reading section 5 reads a command 1B written in the page-description B shortly after the detection of command 3A in the page-description language A.

The emulation B controls the reading section 5 to read commands written in the page-description language B.

Figure 21:
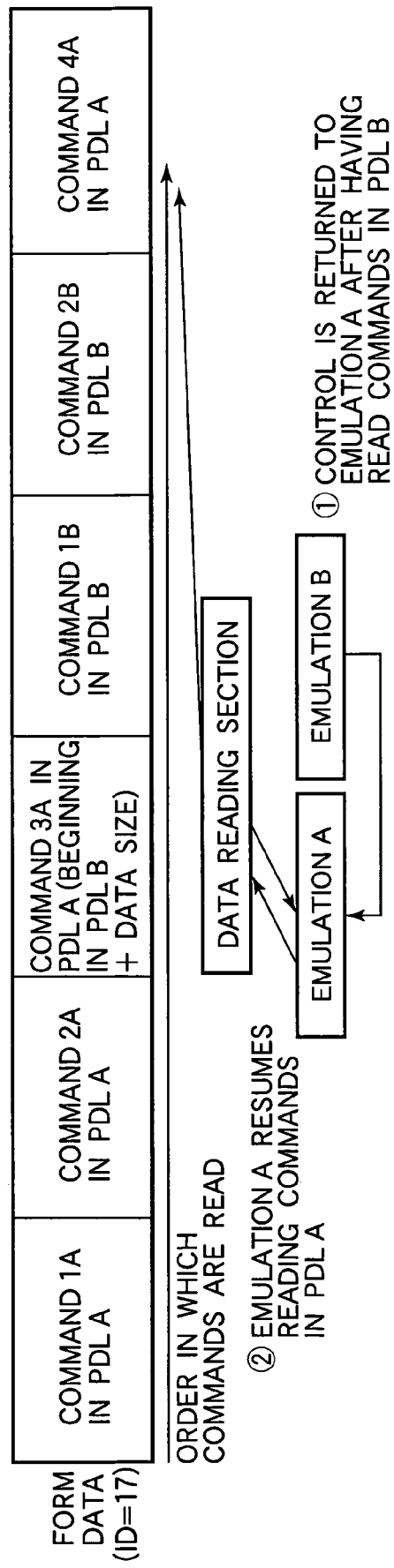
FIG. 21 illustrates the commands when the reading section reads a command written in the page-description A shortly after reading a command and another command that are written in the page-description language B.

FIG. 21 illustrates the commands when the reading section 5 reads a command 4A written in the page-description A shortly after reading command 1B and command 2B written in the page-description language B. Upon completion of reading of commands 1B and 2B, the emulation returns the control to the emulation A. Thus, the emulation A resumes reading a command written in the page-description language A, i.e., command 4A in this example.

Figure 22:
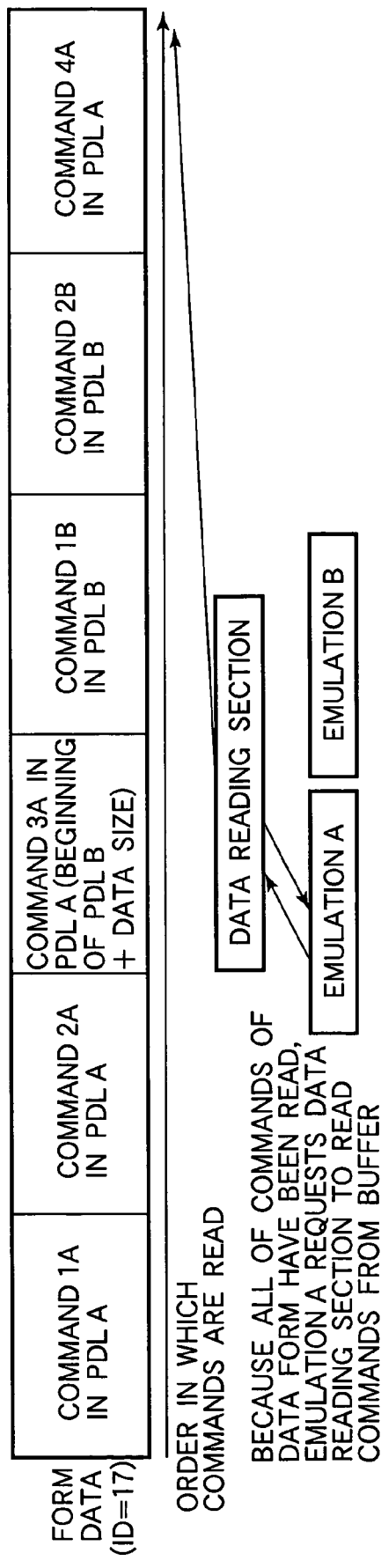
FIG. 22 illustrates the commands when the form data has been completely read from the storage section.

FIG. 22 illustrates the commands when the form data has been completely read from the storage section 10. Once all of the commands of the form data have been read from the storage section 10, the data reading section 5 begins to read the remaining commands of the print job from the buffer 4.

Figure 23:
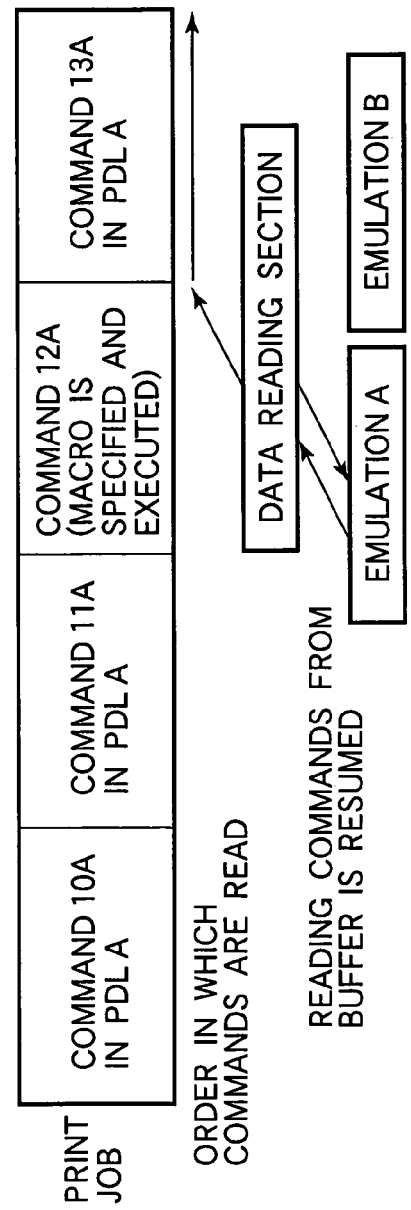
FIG. 23 illustrates the commands when the reading section reads a command 13A written in the page-description language A.

FIG. 23 illustrates the commands when the reading section reads a command 13A written in the page-description language A, which is the first command after command 12A in the page-description language A has been analyzed. The emulation A controls the data reading section 5 to read command 13A.

{Operation of Image Forming Apparatus}

Figure 24:
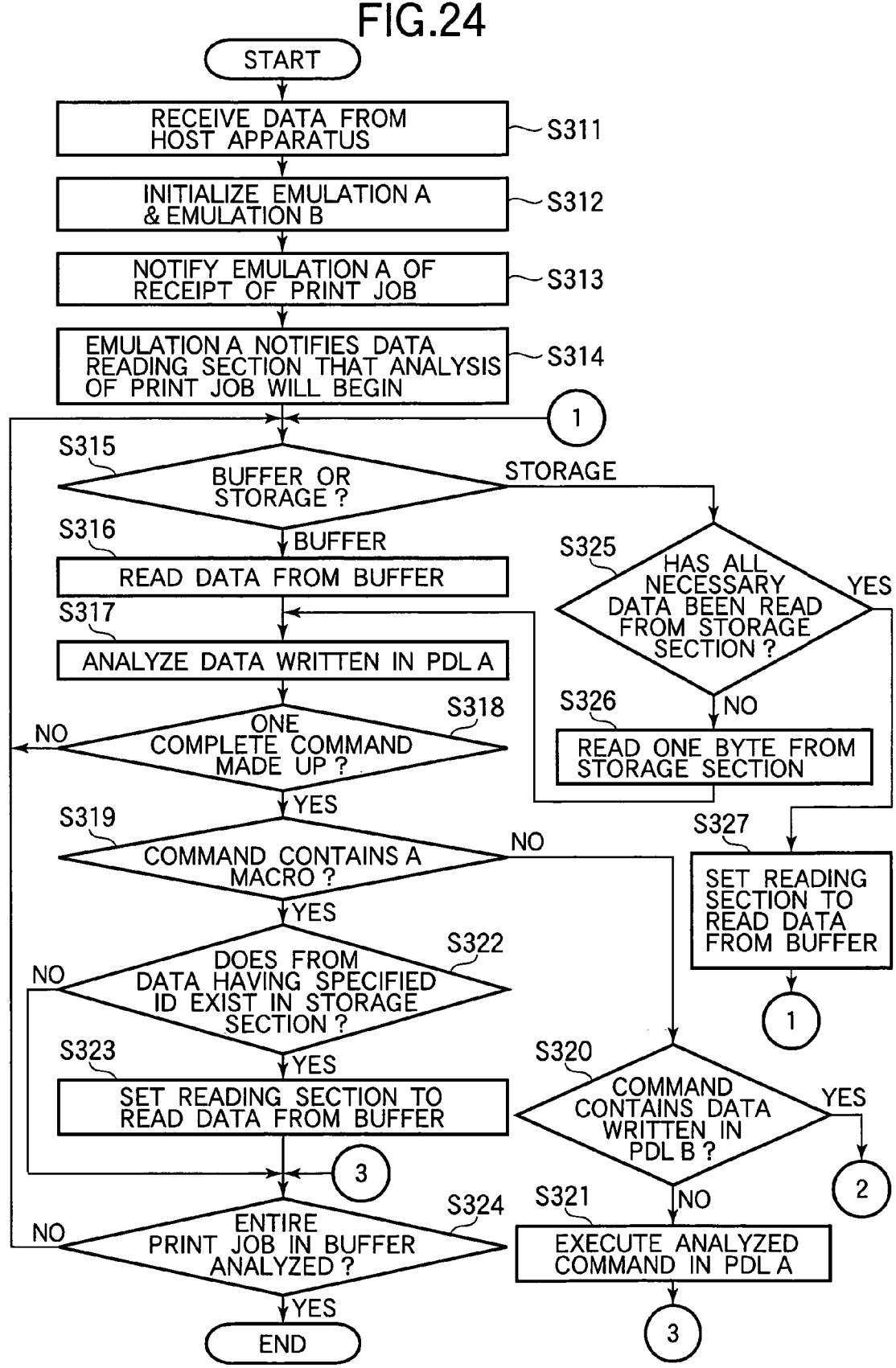
FIGS. 24 and 25 are a flowchart illustrating the operation of the image forming apparatus according to the third embodiment.
Figure 25:
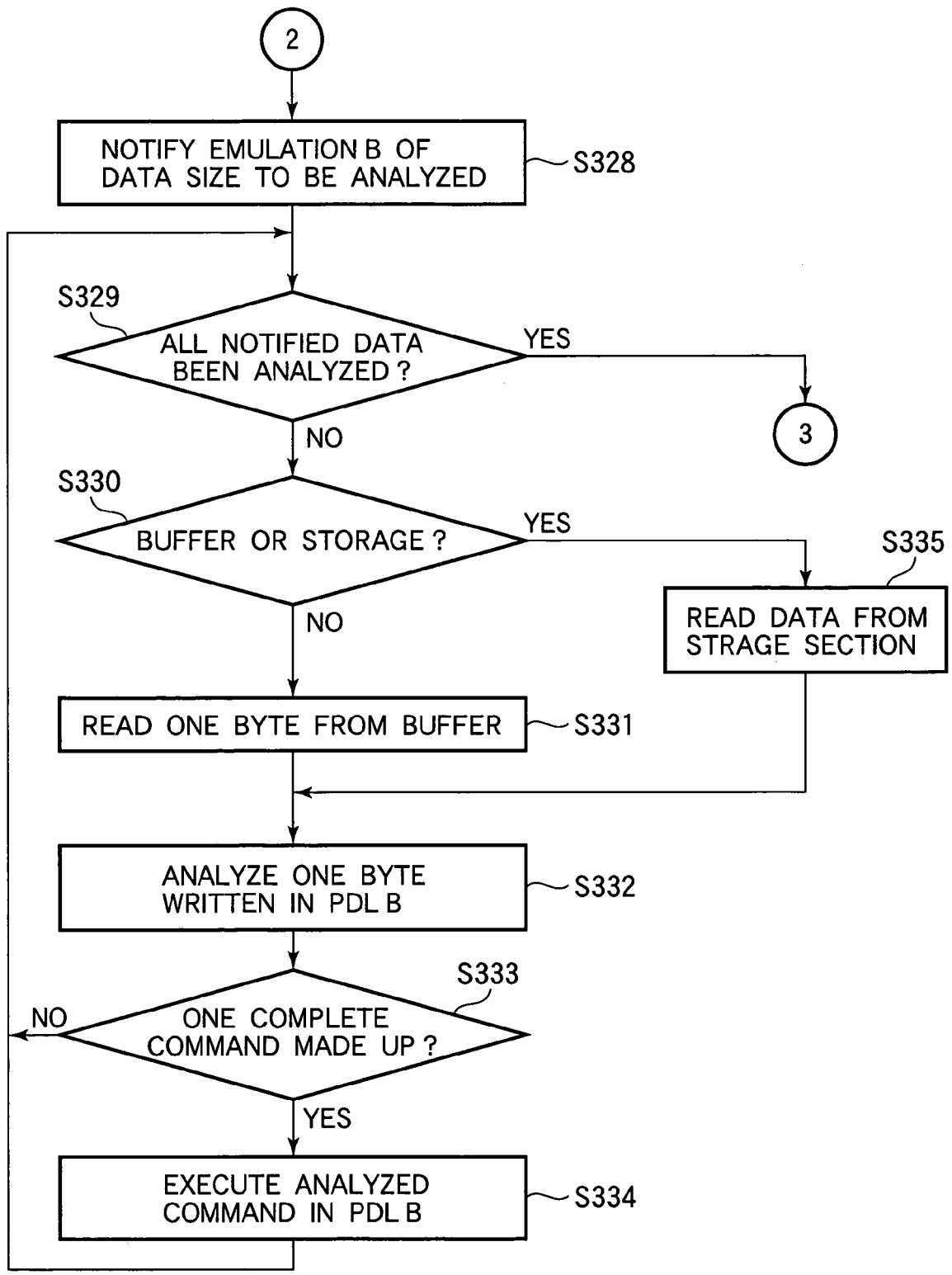

The operation of the emulation A and emulation B will be described with reference to FIGS. 24, 14, and 15. Assume that the storage section 10 has previously received the form data in FIG. 15 from a host apparatus.

Step S311: Upon receiving the frame in FIG. 14 from the host apparatus, the data receiving section 2 stores the received frame into the buffer 4 of the printer 1.

Step S312: The emulation A and emulation B perform their initialization before they initiate to analyze the print job.

Alternatively, the initialization of the emulation may be deferred until immediately before the emulation needs to operate.

Step S313: Then, the job management section 3 notifies the emulation A of the address at which the data is held in the buffer 4 and the data size of the print job. As shown in FIG. 14, the received frame consists of data blocks (i.e., commands) that follow the printer control language. Each data block is made up of at lest one byte and usually a plurality of bytes. The job management section 3 identifies that the data blocks in FIG. 14 form a print job and the data blocks are written in a page-description language(s). The job management section 3 also identifies the data size of the print job and an address at which the print job is stored in the buffer 4.

The job management section 3 analyzes the first data block of the print job and then, in this example, determines that the first data block should be analyzed in the emulation A. The emulation A can then analyze the first data block according to the page-description language A.

Step S314: The emulation A notifies the data reading section 5 that the analysis of the print job will begin.

The data reading section 5 holds a reference position P indicating an address at which the head of the print job is stored in the buffer 4. Alternatively, the address may be notified from the job management section 3.

Step S315: A decision is made to determine whether the data reading section 5 should read the data either from the buffer 4 or from among macros (e.g., ID number of the form data) stored in the storage section 10. If the data is to be read from the buffer 4, the program proceeds to step S316 where a data block (i.e., bytes of data) is read from the buffer 4. If a macro is to be read from the storage section 10, the program proceeds to step S325. It is to be noted that the data is to be read from the buffer 4 initially.

Step S316: The emulation A requests the data reading section 5 to read one byte of data from the buffer 4. The data reading section 5 sends the reference position P, which is an address of data to be read and has been held in the data reading section 5, to the emulation A. The data reading section 5 then updates the reference position P in the data reading section 5.

Step S317: The emulation A analyzes the one byte of data read from the buffer 4.

Step S318: A check is made to determine whether bytes of data read from the buffer 4 make up one complete command. For data written in a page-description language, one command is made up of either one byte or a plurality of bytes. If NO, the program jumps back to step S315 so that the data reading section 5 continues to read bytes of data from the buffer 4 until the bytes of data make up one complete command. If YES, the program proceeds to step S319.

Step S319: A decision is made to determine whether the command specifies a macro having an identifier in the form of ID that identifies an item of form data stored in the storage section 10.

If YES, the program proceeds to step S322.

If NO, the program proceeds to step S320.

Step S322: A decision is made to determine whether the storage section 10 holds the form data having the specified ID.

If NO, it is determined that the command is invalid, and the program simply returns to step S315 through S324.

If YES, the program proceeds to step S324.

Step S323: The emulation A sets the data reading section 5 so that the data reading section 5 is ready to read the form data from the storage section 10. The data reading section 5 holds a reference position S that indicates an address at which the form data is stored in the storage section 10, and the reference position P that indicates the address at which the print job is stored in the buffer 4. This completes the execution of command 12A. (FIG. 14)

Step S324: A decision is made to determine whether the entire print job in the buffer 4 has been analyzed.

If the buffer 4 does not hold data to be read, the data reading section 5 sends a reply "NO DATA" to the emulation A. In other words, if the emulation A receives the reply "NO DATA" from the data reading section 5, it is determined that the analysis of the entire print job in the buffer 4 has been completed, and therefore the emulation A ends the analysis of print job.

If the emulation A does not receive the reply "NO DATA" from the data reading section 5, the program proceeds to step S315.

Step S320: A decision is made to determine whether the command read from the buffer 4 contains data blocks written in the page-description language B.

If YES, the program proceeds to step S328.

If NO, the program proceeds to step S321.

Step S321: The emulation A executes the analyzed command that is written in the page-description language A.

S325: A decision is made to determine whether all the data has been read from the storage section 10.

If YES, the program proceeds to Step S327.

If NO, the program proceeds to Step S326.

Step S326: The data reading section 5 reads one byte of data from the storage section 10.

Step S327: The emulation A sets the data reading section 5 so that the data reading section 5 is ready to read the data from the buffer 4.

Step S328: The data reading section 5 is retaining the reference position P that indicates an address at which the data blocks are held in the buffer 4. Therefore, when the emulation requests the data reading section 5 to read the data blocks from the buffer 4, the data reading section 5 reads the data from where the reading was halted last time. If a command contains data written in the page-description language B, the command contains information on the data size of the following commands written in the page-description language B.

Thus, the emulation A requests the emulation B to analyze the commands written in the page-description language B, and also notifies the emulation B of the data size of the commands written in the page-description language B. The emulation B stores the notified data size therein. The emulation B may be initialized at any timing before the emulation B actually operates.

Step S329: A decision is made to determine whether all of the data blocks of the size notified from the buffer 4 have been analyzed. The emulation B compares the notified data size with the data size that has been analyzed so far, thereby determining whether all of the notified data blocks have been analyzed. If the analysis of all of the notified data blocks has been completed, the program proceeds to Step S324. If the analysis of all of the data blocks has not been completed yet, the program proceeds to step S330.

S330: A decision is made to determine whether the data reading section 5 should read the data either from the buffer 4 or from among macros (e.g., ID number of the form data) stored in the storage section 10.

If the data is to be read from the buffer 4, the program proceeds to step S331.

If a macro is to be read from the storage section 10, the program proceeds to step S335. If the data reading section 5 is referring to the storage section 10 ("STORAGE" at step S330), the program proceeds to step S335.

S335: The data reading section 5 reads one byte of data from the storage section 10.

S331: The data reading section 5 reads a data block (i.e., one byte of data) from the data from the buffer 4.

Step S332: The emulation B assumes that the data block received from the data reading section 5 is written in the page-description language B, and analyzes the data block.

Step S333: A decision is made to determine whether the data blocks read through the data reading section 5 make up one complete command. For data written in the page-description Language B, one command consists of either one byte or a plurality of bytes.

Therefore, if the answer is NO at step S333, then the data reading section 5 continues to read the data blocks until the read data blocks make up one complete command (step S329 to S323).

If the answer is YES, the program proceeds to step S334.

Step S334: The emulation B executes the content of the analyzed command written in the page-description language B, and then the program loops back to step S329.

As described above, frequently used data such as form data, i.e., ruled lines used for making a table can be stored previously in the storage section 10. For example, if a table is to be made, then numerical data received from an information processing apparatus is overwritten with rules lines, thereby completing a table of the numerical data.

Although the third embodiment has been described with respect to data that contains macro data previously registered in a storage section, the third embodiment may also be applied to authenticated print data that contains data that should be analyzed by a plurality of emulations. The operator selects the authenticated print data from the operation panel, and commands the printer to print.

Fourth Embodiment

{Configuration}

A fourth embodiment is directed to shortening the time required for accessing the storage section such as a hard disk. The content of the form data file in a storage section is first copied into a data copy area such as a random access memory (RAM) that has a high access speed. The data in the data copy area is then accessed during a printing operation.

The fourth embodiment will be described primarily with respect to a portion different from the third embodiment in FIG. 13. A print job includes commands A expressed in the main page-description language A and commands B expressed in the sub page-description language B.

Figure 26:
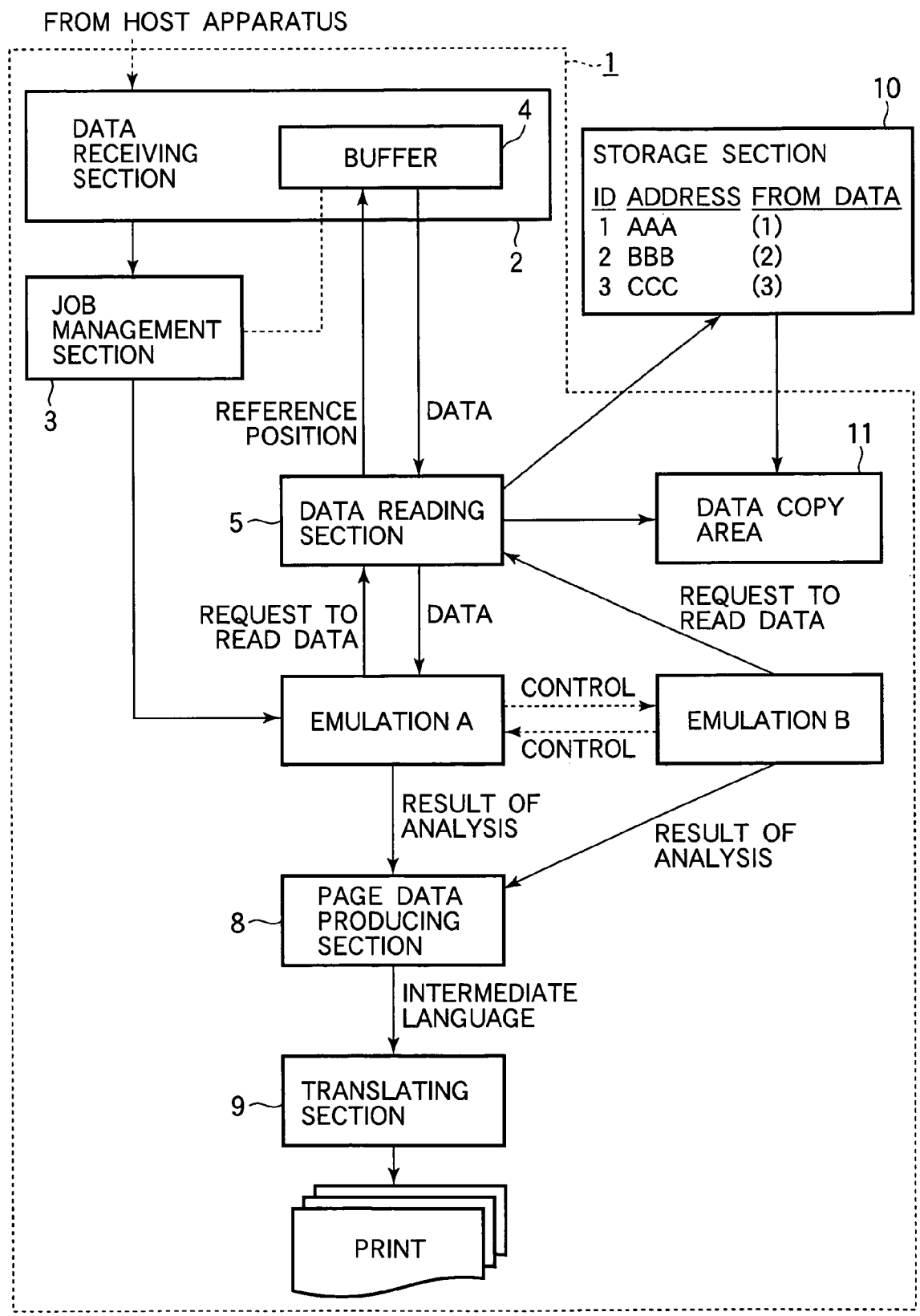
FIG. 26 illustrates a printer according to a fourth embodiment.

FIG. 26 illustrates a printer 1 according to a fourth embodiment.

A printer 1 includes a memory means such as a RAM having a data copy area 11 of a predetermined size. A form data file is read from a storage section 10 by as large an amount of data as the data copy area 11 can hold at a time.

Figure 27:
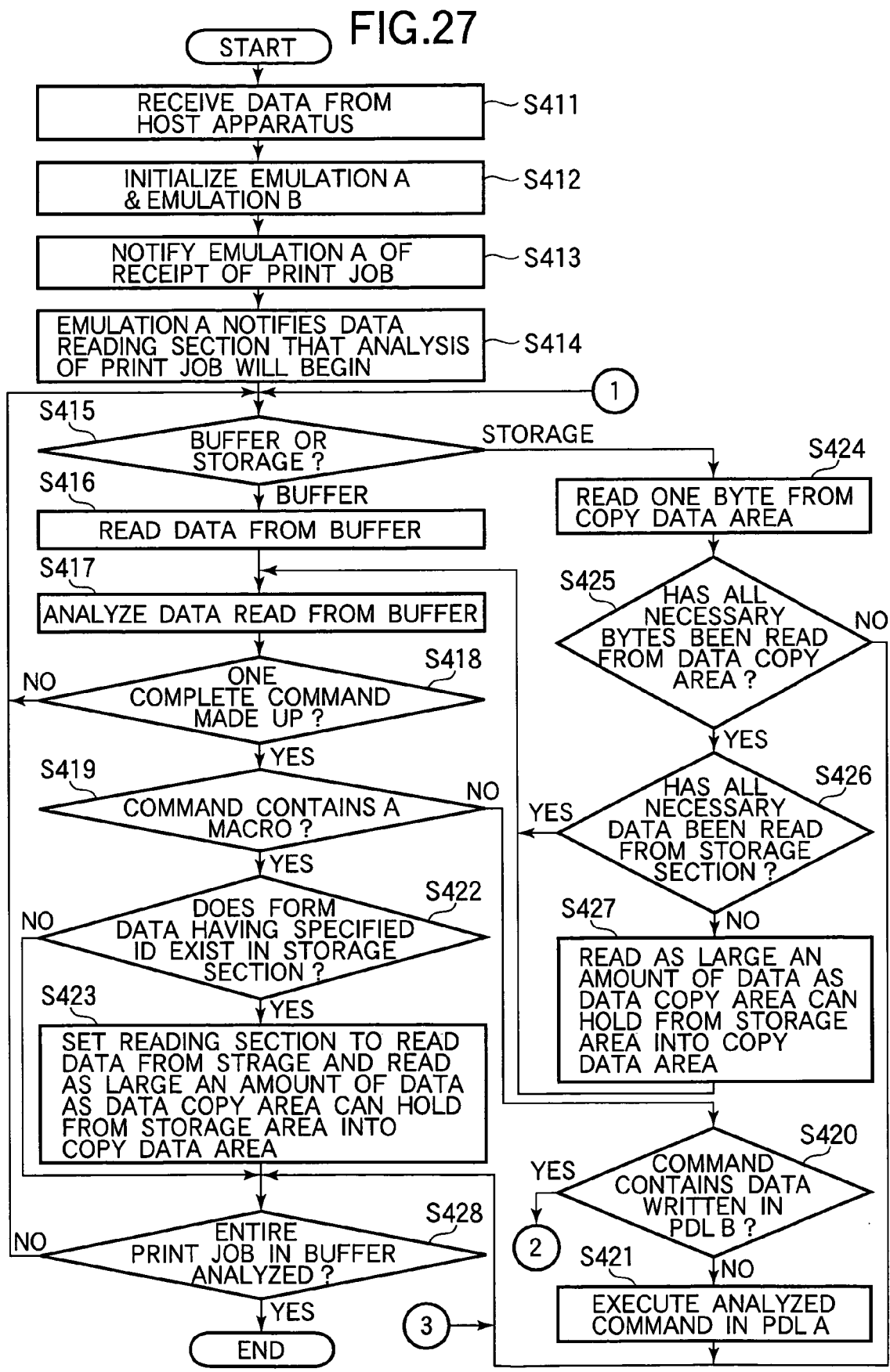
FIG. 27 and FIG. 28 are a flowchart illustrating the operation of the image forming apparatus according to the fourth embodiment.
Figure 28:
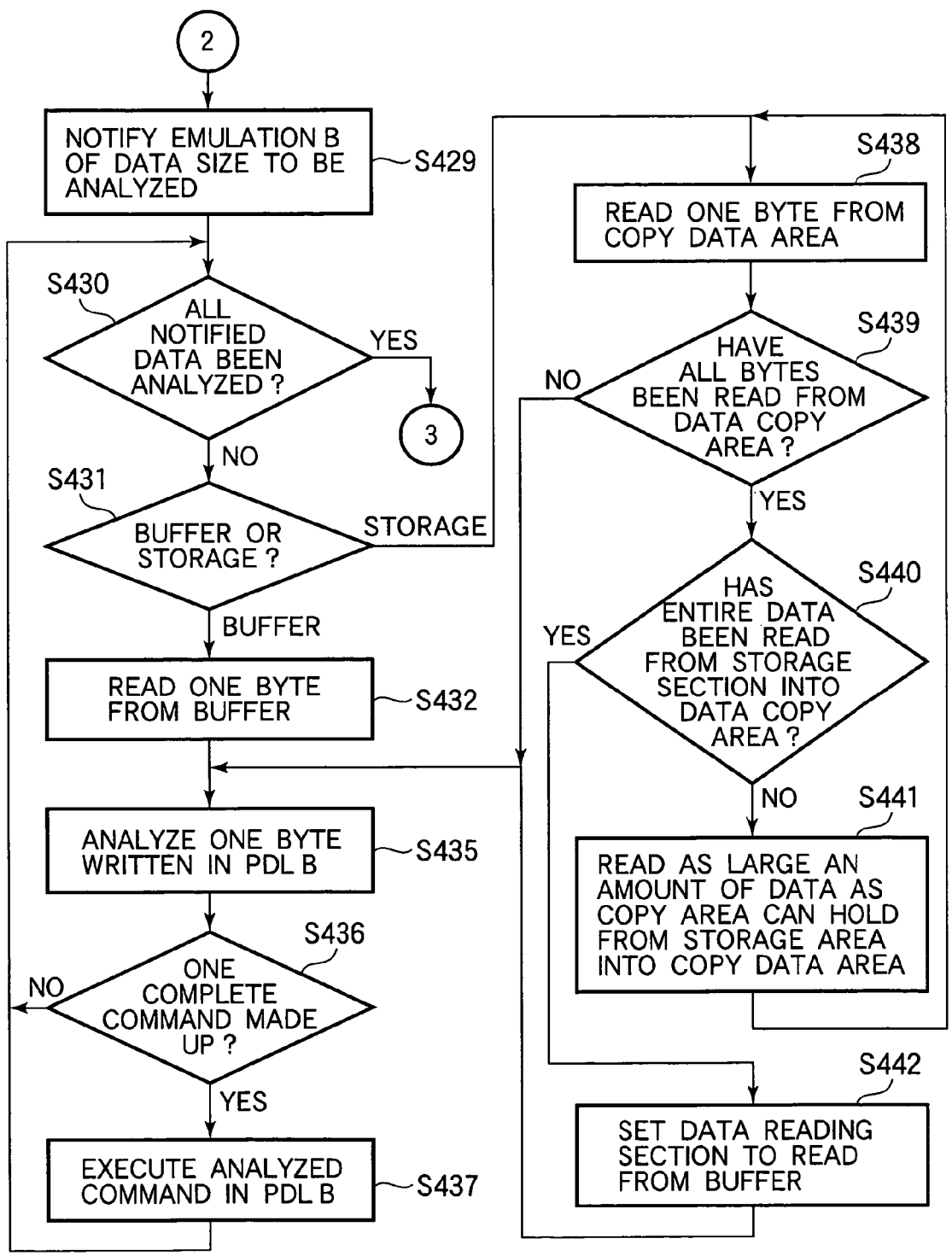

FIG. 27 and FIG. 28 are a flowchart illustrating the operation of the image forming apparatus 1.

Figure 29:
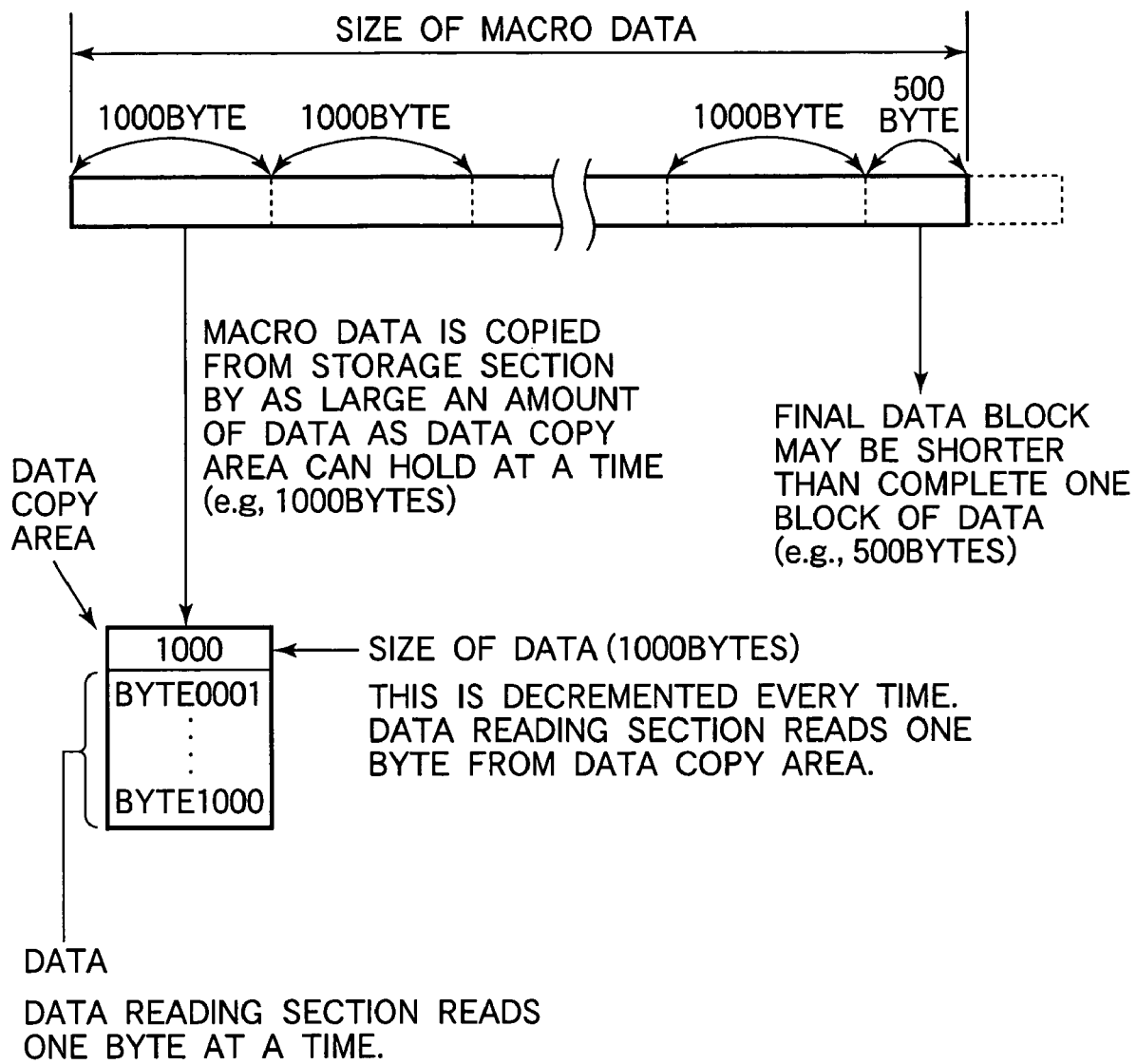
FIG. 29 illustrates the operation of a data copy area.
Figure 26:
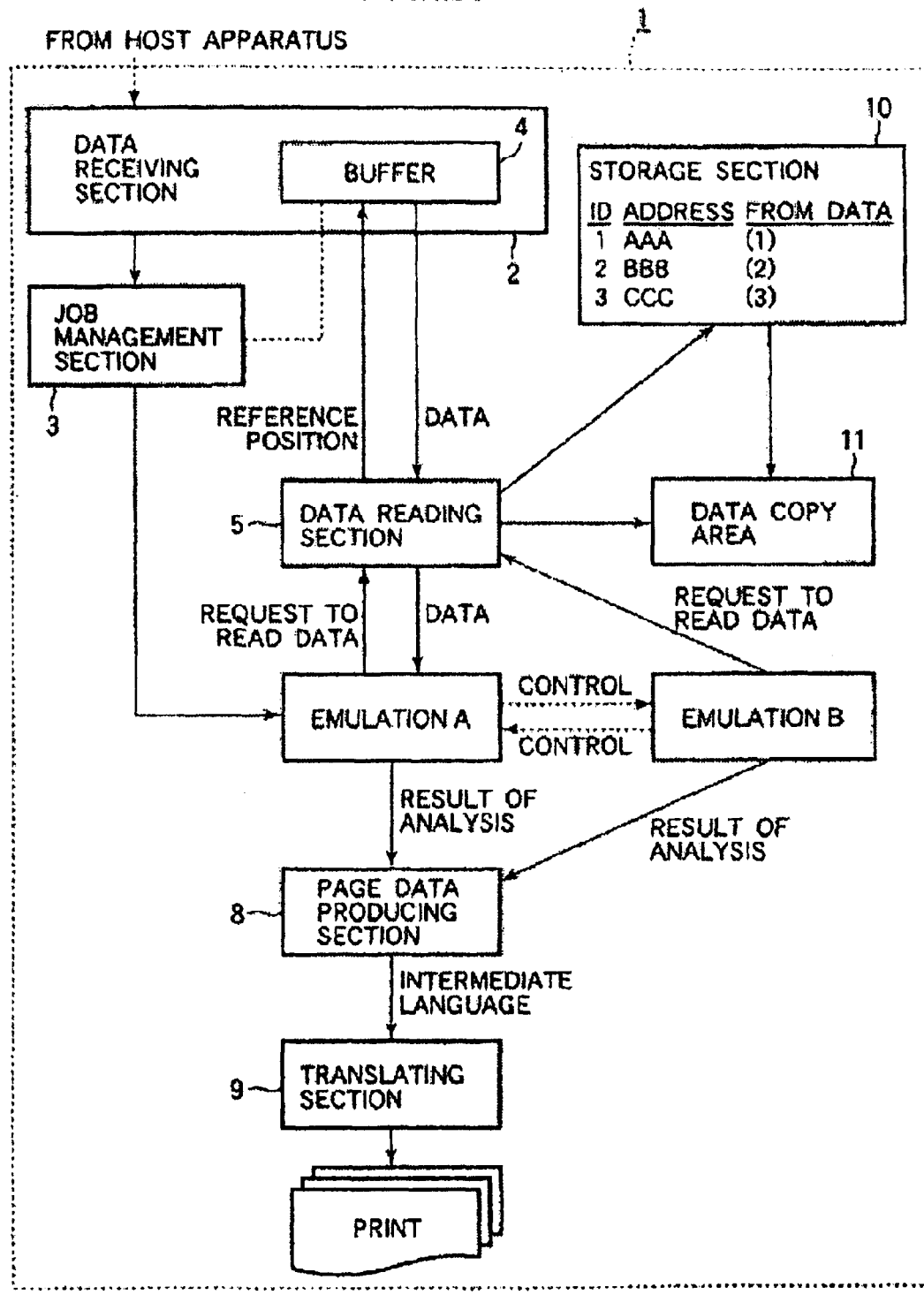

FIG. 29 illustrates the operation of a data copy area 11.

The fourth embodiment will be described with reference to FIGS. 27, 28, and 29. The steps in a flowchart in FIG. 27 that are the same as those in the third embodiment have been given the same step numbers.

Step S422: A decision is made to determine whether the storage section 10 holds the form data having a specified ID. If NO, then it is determined that the command is invalid. Thus, the program proceeds step S428. If YES, the program proceeds to step S423.

Step S423: The emulation A requests the data reading section 5 to read the form data file from the storage section 10.

Thus, the reading section 5 reads the form data (FIG. 15) by as large an amount of data as the data copy area 11 can hold at a time, while also holding a reference position P at which the print job is stored in the buffer 4. The data reading section 5 holds a reference position S at which the form data is stored in the data copy area 11, while also storing information on data size (e.g., 1000 bytes) of the data stored in the data copy area 11 at that time. The information on data size represents an amount of data that is copied from the storage section 10 into the data copy area 11 at a time.

Step S415: A decision is made to determine whether the data reading section 5 should read the data either from the buffer 4 or from among macros (e.g., ID number of the form data) stored in the storage section 10. If the data is to be read from the buffer 4, the program proceeds to step S416 where one byte of data is read from the buffer 4. If a macro is to be read from the storage section 10, the program proceeds to step S424. It is to be noted that the data is to be read from the buffer 4 until step S423 is performed.

Step S424: The data reading section 5 reads one byte of data from the data copy area 11 by using the reference position S held in the data reading section 5. Subsequently, the data reading section 5 updates both the reference position S and the information on data size of the data remaining in the data copy area 11 at that time.

Step S425: A decision is made to determine whether the data reading section 5 has read out all of the bytes from the copy area 11.

If NO, the program proceeds to step S428.

If YES, the program proceeds to step S426.

Step S426: A decision is made to determine whether the data reading section 5 has read out the entire form data checked at step S422 from the storage section 10 into the copy area 11.

If NO, then the program proceeds to step S427.

If YES, then the program proceeds to step S417.

Step S417: The emulation A analyzes the data read from the buffer 4.

Step S427: The data reading section 5 reads the data from the storage section 10 into the data copy area 11, the amount of the data being as large an amount of data as the data copy area 11 can hold at a time (e.g., 1000 bytes).

Then, the data reading section 5 updates both the reference position S and the information on the data size of data blocks remaining in the data copy area 11 at that time. The trailing portion of the data to be read from the storage section 10 may be as short as it occupies only a fraction of the memory capacity of the data copy area 11, in which case, the entire trailing portion is simply read into the data copy area.

Step S429: The emulation A requests the emulation B to analyze the commands written in the page-description language B, and notifies the emulation B of the data size of the commands written in the page-description language B.

The emulation B stores the notified data size therein. The emulation B may be initialized at any timing before the emulation B actually operates.

The data reading section 5 is retaining the reference position P that indicates an address at which the data blocks are held in the buffer 4. Therefore, when the emulation requests the data reading section 5 to read the data blocks from the buffer 4, the data reading section 5 reads the data from where the reading was halted last time. If a command contains data written in the page-description language B, the command contains information on the data size of the following commands written in the page-description language B.

Step S430: A decision is made to determine whether the analysis of all the data blocks notified at Step S429 has been completed. The emulation B compares the notified data size with the data size that has been analyzed, thereby determining whether all of the data blocks have been analyzed.

If the analysis of all the data blocks notified at Step S429 has been completed, the program proceeds to Step S428.

If the analysis of all the data blocks notified at Step S429 has not been completed yet (N at step S430), the program proceeds to step S431.

S431: A decision is made to determine whether the data reading section 5 should read the data either from the buffer 4 or from among macros (e.g., ID number of the form data) stored in the storage section 10.

If the data is to be read from the buffer 4, the program proceeds to step S435.

If a macro is to be read from the storage section 10, the program proceeds to step S438.

Step S432: The data reading section 5 reads one byte of data from the buffer 4.

Step S435: The emulation B assumes that the one byte of data received from the data reading section 5 is written in the page-description language B, and analyzes the data block.

Step S436: A decision is made to determine whether the bytes read through the data reading section 5 make up one complete command. For data written in the page-description language B, one command consists of either one byte or a plurality of bytes. Therefore, if NO at step S436, then the program loops back to steps S430 to repeat steps S430 to S436 until the read data blocks make up one complete command. If YES, the program proceeds to step S437.

Step S437: The emulation B executes the content of the command written in the page-description language B, and then the program jumps back to step S430.

Step S432: The data reading section 5 reads one byte of data from the data copy area 11 by using the reference position S. Subsequently, the data reading section 5 updates both the reference position S and the information on data size remaining in the data copy area 11 at that time.

Step S439: A decision is made to determine whether the data reading section 5 has read out the entire bytes from the copy area 11.

If YES, the program proceeds to step S440.

If NO, the program proceeds to step S435.

Step S440: A decision is made to determine whether the entire data notified at step S429 has been read from the storage into the data copy area 11.

If YES, the program proceeds to Step S442.

If NO, the program proceeds to step S441.

Step S442: The emulation A sets the data reading section 5 so that the data reading section 5 is ready to read the data from the buffer 4.

Step S441: If the information on the data size remaining in the data copy area 11 (updated at step S438) is "0" at Step S439, then the data reading section 5 reads the data from the storage section 10 into the copy area 11. Then, the data reading section 5 updates both the reference position S and the information on data size of the data remaining in the data copy area 11 at that time. The trailing portion of notified data blocks may occupy only a fraction (e.g., 500 bytes) of the capacity of the data copy area 11, in which case, the trailing portion of data block is simply read into the data copy area 11.

As described above, the content of the form data file in the storage section 10 is first copied into the data copy area 11 that has a high access speed and is provided in the printer 1. The fourth embodiment eliminates the need for accessing a form data file in the storage section 10 (e.g., hard disk drive) on a byte-by-byte basis, shortening the time required for reading the data from the storage section 10.

The present invention may be applied generally to printing apparatuses in which draw commands written in a page-description language are received from a host apparatus and a print image is produced from the draw commands.

What is claimed is:

1. An image information processing apparatus comprising:
   a language selecting section that selects a first page-description language and a second page-description language from among a plurality of page-description languages, the first page-description language describing a first part of an image of a print job and the second page-description language describing a second part of the image in the print job; and
   a print job creating section that creates an item of image data that contains a first item of data based on a first command system written in the first page-description language and a second item of data based on a second command system written in the second page-description language, the first item of data and the second item of data being laid on a page of print medium.

2. An image forming apparatus comprising:
   a data receiving section that receives image data for a print job from an image processing apparatus, the image data containing a first item of data based on a first command system and a second item of data based on a second command system, the second item of data being inserted into the first item of data;
   a first command analyzing section that analyzes the first item of data to produce a first result of analysis;
   a second command analyzing section that analyzes the second item of data to produce a second result of analysis; and
   a page data producing section that produces an item of image data for a page of print medium by combining the first result of analysis with the second result of analysis.

3. The image forming apparatus according to claim 2, further comprising a subsequent data detecting section that detects that a description in data;
   wherein when the subsequent data detecting section detects a description written in the second command system in the first item of data, the subsequent data detecting section switches from said first command analyzing section to said second command analyzing section.

4. The image forming apparatus according to claim 3, further comprising:
   a non-volatile memory area that holds information previously received from an external host apparatus; and
   a data reading section that reads the information from said non-volatile memory section in response to a signal received from an image processing apparatus.

5. The image forming apparatus according to claim 2, further comprising a temporary storing area that holds the second result of analysis when said second command analyzing section has analyzed the second item of data.

6. The image forming apparatus according to claim 5, further comprising:
   a non-volatile memory area that holds information previously received from an external host apparatus; and
   a data reading section that reads the information from said non-volatile memory section in response to a signal received from an image processing apparatus.

7. The image forming apparatus according to claim 2, further comprising:
   a non-volatile memory area that holds information previously received from an external host apparatus; and a data reading section that reads the information from said non-volatile memory section in response to a signal received from an image processing apparatus.

8. The image forming apparatus according to claim 7, further comprising:

a random access memory that receives the information from said non-volatile memory section and holds the received information, wherein when said first command analyzing section and said second command analyzing section begin to analyze the information, said data reading section reads an amount of information at a time into said random access memory.

9. A printing system incorporating an image information processing, comprising:

a language selecting section that selects a first page-description language and a second page-description language from among a plurality of page-description languages, the first page-description language describing a first part of an image and the second page-description language describing a second part of the image; and a print job creating section that creates an item of image data that contains a first item of data based on a first command system written in the first page-description language and a second item of data based on a second command system written in the second page-description language, and said image forming apparatus according to claim 2.

10. A printing system incorporating an image information processing, apparatus comprising:

a language selecting section that selects a first page-description language and a second page-description language from among a plurality of page-description languages, the first page-description language describing a first part of an image and the second page-description language describing a second part of the image; and a print job creating section that creates an item of image data that contains a first item of data based on a first command system written in the first page-description language and a second item of data based on a second command system written in the second page-description language, and said image forming apparatus according to claim 3.

11. A printing system incorporating an image information processing, comprising:

a language selecting section that selects a first page-description language and a second page-description language from among a plurality of page-description languages, the first page-description language describing a first part of an image and the second page-description language describing a second part of the image; and a print job creating section that creates an item of image data that contains a first item of data based on a first command system written in the first page-description language and a second item of data based on a second command system written in the second page-description language, and said image forming apparatus according to claim 5.

12. A printing system incorporating an image information processing, comprising:

a language selecting section that selects a first page-description language and a second page-description language from among a plurality of page-description languages, the first page-description language describing a first part of an image and the second page-description language describing a second part of the image; and a print job creating section that creates an item of image data that contains a first item of data based on a first command system written in the first page-description language and a second item of data based on a second command system written in the second page-description language, and said image forming apparatus according to claim 7.

13. A printing system incorporating an image information processing apparatus, comprising:

a language selecting section that selects a first page-description language and a second page-description language from among a plurality of page-description languages, the first page-description language describing a first part of an image and the second page-description language describing a second part of the image; and a print job creating section that creates an item of image data that contains a first item of data based on a first command system written in the first page-description language and a second item of data based on a second command system written in the second page-description language, and said image forming apparatus according to claim 4.

* * * * *

UNITED STATES PATENT AND TRADEMARK OFFICE
CERTIFICATE OF CORRECTION

PATENT NO.        : 7,589,861 B2
APPLICATION NO.   : 11/216237
DATED             : September 15, 2009
INVENTOR(S)       : Yuuji Hirano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Fourteenth Day of December, 2010

David J. Kappos
*Director of the United States Patent and Trademark Office* ns

(12) EX PARTE REEXAMINATION CERTIFICATE (8934th)
United States Patent
Hirano

(10) Number: US 7,589,861 C1
(45) Certificate Issued: Mar. 27, 2012

(54) IMAGE FORMING APPARATUS AND PRINTING SYSTEM

(75) Inventor: Yuuji Hirano, Fukushima (JP)

(73) Assignee: Oki Data Corporation, Minato-Ku, Tokyo (JP)

Reexamination Request:
No. 90/011,718, May 31, 2011

Reexamination Certificate for:
Patent No.: 7,589,861
Issued: Sep. 15, 2009
Appl. No.: 11/216,237
Filed: Aug. 31, 2005

Certificate of Correction issued Dec. 14, 2010.

(30) Foreign Application Priority Data

Aug. 31, 2004 (JP) .................................... 2004-251519

(51) Int. Cl.
*G06K 15/00* (2006.01)
*H04N 1/46* (2006.01)

(52) U.S. Cl. ................... 358/1.18; 358/1.12; 358/1.16; 358/1.17; 358/538

(58) Field of Classification Search ................... None
See application file for complete search history.

(56) References Cited

To view the complete listing of prior art documents cited during the proceeding for Reexamination Control Number 90/011,718, please refer to the USPTO's public Patent Application Information Retrieval (PAIR) system under the Display References tab.

*Primary Examiner* — Henry N Tran

(57) ABSTRACT

An image information processing apparatus includes a language selecting section and a print job creating section. The language selecting section selects a first page-description language and a second page-description language from among a plurality of page-description languages. The first page-description language describes a first part of an image and the second page-description language describing a second part of the image. The print job creating section creates an item of image data that contains a first item of data based on a first command system written in the first page-description language and a second item of data based on a second command system written in the second page-description langage.

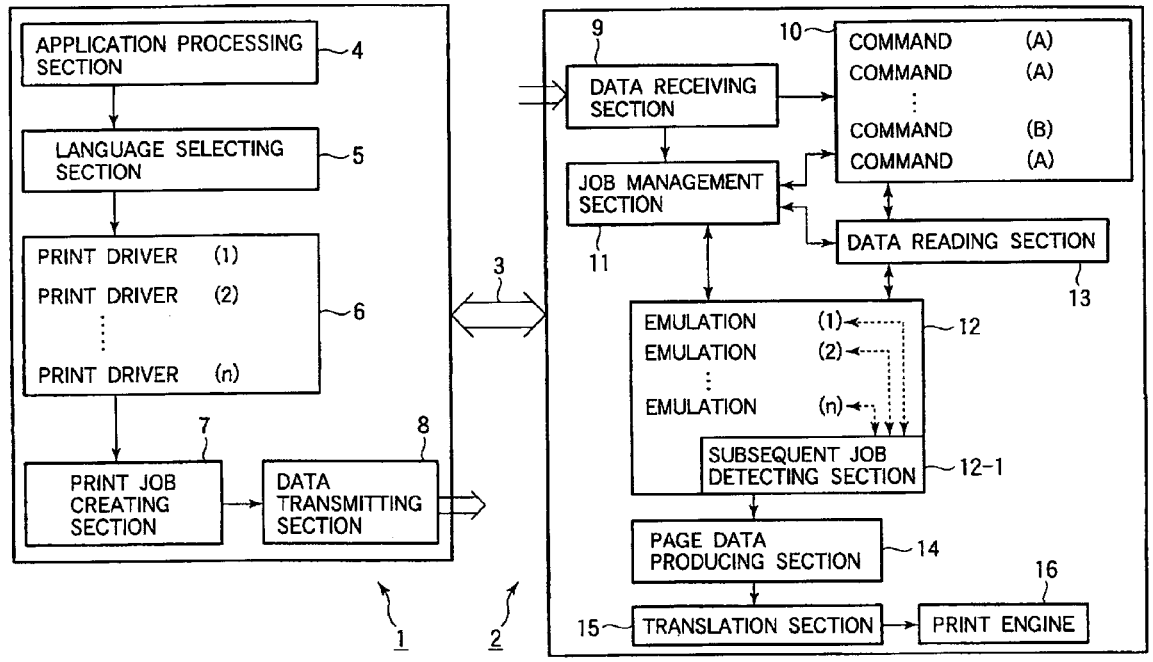

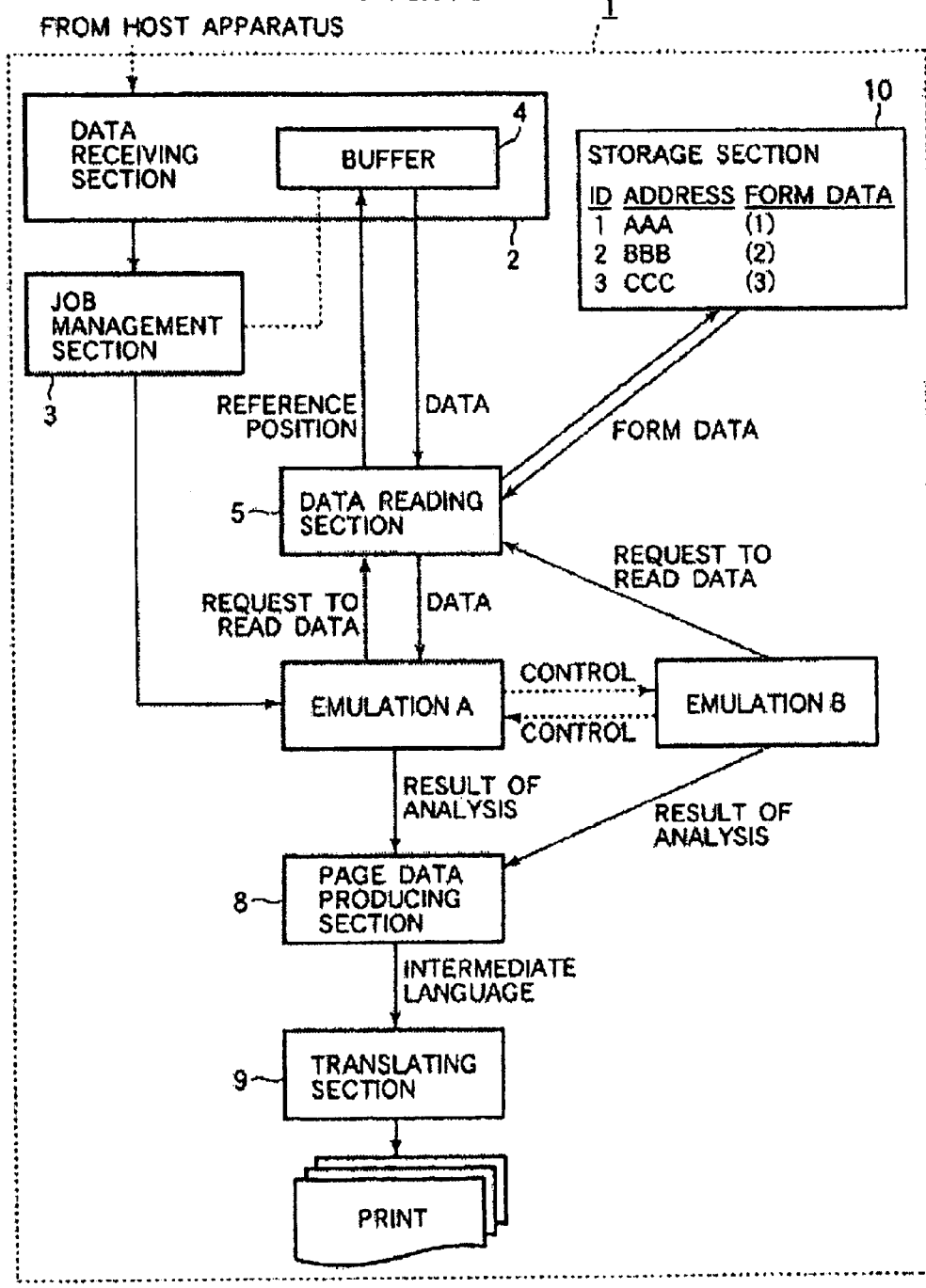
FIG.13
AMENDED

US 7,589,861 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

FIG. No. 13: The storage section 10 has been placed within the Printer 1.

FIG. No. 26: The storage section 10 has been placed within the Printer 1.

AS A RESULT OF REEXAMINATION, IT HAS BEEN DETERMINED THAT:

Claim 6 is cancelled.

Claims 1-4, 7 and 9-13 are determined to be patentable as amended.

Claims 5 and 8, dependent on a amended claim, are determined to be patentable.

New claims 14-17 and 18 are added and determined to be patentable.

1. An image information processing apparatus comprising:
    a language selecting section that selects a first page-description language and a second page-description language from among a plurality of page-description languages, the first page-description language describing a first part of an image of a print job and the second page-description language describing a second part of the image in the print job; and
    a print job creating section that creates an item of image data that contains a first item of data based on a first command system written in the first page-description language and a second item of data based on a second command system written in the second page-description language, the first item of data and the second item of data being laid on a page of print medium, *wherein the first item of data includes a first command, and the second item of data includes a second command, and wherein the first command contains a description indicating that the second command immediately follows the first command, and a description indicative of a data size of the second command.*

2. An image forming apparatus comprising:
    a data receiving section that receives image data for a print job from an image *information* processing apparatus, the image data containing a first item of data based on a first command system and a second item of data based on a second command system, the second item of data being inserted into the first item of data;
    a first command analyzing section that analyzes the first item of data to produce a first result of analysis;
    a second comand analyzing section that analyzes the second item of data to produce a second result of analysis; and
    a page data producing section that produces an item of image data for a page of print medium by combining the first result of analysis with the second result of analysis,
    *wherein the first item of data includes a first command, and the second item of data includes a second command, and wherein the first command contains a description indicating that the second command immediately follows the first command and a description indicative of a data size of the second command.*

3. The image forming apparatus according to claim 2, further comprising a subsequent [data] *job* detecting section that detects [that a] *the* description in *the image* data;
    wherein when the subsequent [data] *job* detecting section detects *in the first item of data that an immediately following command contains* a description written in the second command system [in the first item of data], the subsequent [data] *job* detecting section switches from said first command analyzing section to said second command analyzing section.

4. The image forming apparatus according to claim 3, further comprising:
    a non-volatile memory [area] *section* that holds information previously received from an external host apparatus; and
    a data reading section that reads the information from said non-volatile memory section in response to a signal received frmo an image processing apparatus.

7. The image forming apparatus according to claim 2, further comprising:
    a non-volatile memory [area] *section* that holds information previously received from an external host apparatus; and
    a data reading section that reads the information from said non-volatile memory section in response to a signal received from an image processing apparatus.

9. A printing system incorporating an image information [processing, comprising:] *processing apparatus that comprises:*
    a language selecting section that selects a first page-description language and a second page-description language from among a plurality of page-description languages, the first page-description language describing a fisrt part of an image and the second page-description language describing a second part of the image; and
    a print job creating section that creates an item of image data that contains a first item of data based on a first command system written in the first page-description language and a second item of data based on a second command system written in the second page-description language, and said image forming apparatus according to claim 2.

10. A printing system incorporating an image information [processing, apparatus comprising:] *processing apparatus that comprises:*
    a language selecting section that selects a first page-description language and a second page-description language from among a plurality of page-description languages, the first page-description language describing a first part of an image and the second page-description language describing a second part of the image; and
    a print job creating section that creates an item of image data that contains a first item of data based on a first command system written in the first page-description language and a second item of data based on a second command system written in the second page-description language, and said image forming apparatus according to claim 3.

11. A printing system incorporating an image information [processing, comprising:] *processing apparatus that comprises:*
    a language selecting section that selects a first page-description language and a second page-description language from among a plurality of page-description languages, the first page-description language describing a first part of an image and the second page-description language describing a second part of the image; and
    a print job creating section that creates an item of image data that contains a first item of data based on a first command system written in the first page-description language and a second item of data based on a second command system written in the second page-description language, and said image forming apparatus according to claim 5.

12. A printing system incorporating an image information [processing, comprising:] *processing apparatus that comprises:*
    a language selecting section that selects a first page-description language and a second page-description language from among a plurality of page-description languages, the first page-description language describing a first part of an image and the second page-description language describing a second part of the image; and
    a print job creating section that creates an item of image data that contains a first item of data based on a first command system written in the first page-description language and a second item of data based on a second command system written in the second page-description language, and said image forming apparatus according to claim 7.

13. A printing system incorporating an image information processing [apparatus, comprising:] *apparatus that comprises:*
    a language selecting section that selects a first page-description language and a second page-description from among a plurality of page-description languages, the first page-description language describing a first part of an image and the second page-description language describing a second part of the image; and
    a print job creating section that creates an item of image data that contains a first item of data based on a first command system written in the first page-description language and a second item of data based on a second command system written in the second page-description language, and said image forming apparatus according to claim 4.

*14. The image information processing apparatus according to claim 1, wherein the item of image data for the print job includes an initial command that is written in the first page-description language.*

*15. The image information processing apparatus according to claim 1, wherein the second item of data includes a plurality of commands each of which has a first size of data block, and at least one command that contains data having a second size of data block larger than the first size of data block,*
    *wherein image data in the at least one command includes a third part and a fourth part following the third part, the third part containing data of the first size and the fourth part containing data of a third size smaller than the first size;*
    *wherein a first command written in the first page-description language immediately preceding the third part contains a description indicating that at least one command written in the second page-description language immediately follows the first command, and a description indicative of a data size of the at least one command written in the second page-description language; and*
    *wherein a second command written in the first page-description language immediately preceding the fourth part contains a description indicating that the fourth part immediately follows the second command, and indicating a data size of the fourth part.*

*16. The image forming apparatus according to claim 2, wherein said first command analyzing section includes a subsequent job detecting section for detecting that the at least one command written in the second page-description language immediately follows the at least one of the commands written in the first page-description language.*

*17. The image forming apparatus according to claim 2, wherein the item of image data for the print job includes an initial command that is written in the first page-description language.*

*18. The image forming apparatus according to claim 2, wherein the second item of data includes a plurality of commands each of which has a first size of data block, and at least one command that contains data having a second size of data block larger than the first size of data block,*
    *wherein image data in the at least one command includes a third part and a fourth part following the third part, the third part containing data of the first size and the fourth part containing data of a third size smaller than the first size;*
    *wherein a first command written in the first page-description language immediately preceding the third part contains a description indicating that at least one command written in the second page-description language immediately follows the first command, and a description indicative of a data size of the at least one command written in the second page-description language; and*
    *wherein a second command written in the first page-description language immediately preceding the fourth part contains a description indicating that the fourth part immediately follows the second command, and indicating a data size of the fourth part.*

* * * * *